(12) United States Patent
Smith

(10) Patent No.: US 7,144,516 B2
(45) Date of Patent: Dec. 5, 2006

(54) SETTLING TANK AND METHOD FOR SEPARATING A SOLIDS CONTAINING MATERIAL

(75) Inventor: Donald Roy Smith, Calgary (CA)

(73) Assignee: BOS Rentals Limited, Calgary (CA)

( * ) Notice: Subject to any disclaimer, the term of this patent is extended or adjusted under 35 U.S.C. 154(b) by 100 days.

(21) Appl. No.: 10/970,953

(22) Filed: Oct. 22, 2004

(65) Prior Publication Data

US 2006/0086676 A1    Apr. 27, 2006

(51) Int. Cl.
*B01D 21/02* (2006.01)

(52) U.S. Cl. .................. 210/803; 210/523; 210/532.1; 210/521; 210/533

(58) Field of Classification Search ................ 210/800, 210/801, 803, 523, 525, 532.1, 521, 533, 210/536
See application file for complete search history.

(56) References Cited

U.S. PATENT DOCUMENTS

| | | | |
|---|---|---|---|
| 2,010,540 A * | 8/1935 | Evans .................... | 210/523 |
| 4,378,290 A | 3/1983 | Kennedy, Jr. | |
| 4,474,254 A | 10/1984 | Etter et al. | |
| 4,536,286 A | 8/1985 | Nugent | |
| 4,659,460 A | 4/1987 | Muller et al. | |
| 5,015,393 A * | 5/1991 | Russell et al. .......... | 210/525 |
| 5,089,118 A * | 2/1992 | Mahoney .............. | 210/523 |
| 5,176,838 A * | 1/1993 | Chin et al. ............. | 210/525 |
| 5,312,551 A | 5/1994 | Perron et al. | |
| 5,626,748 A | 5/1997 | Rose | |
| 5,948,244 A * | 9/1999 | Fortier .................. | 210/532.1 |
| 6,391,195 B1 | 5/2002 | Layton | |
| 6,491,830 B1 * | 12/2002 | Batten et al. ........... | 210/803 |
| 6,613,237 B1 * | 9/2003 | Pan et al. ............... | 210/523 |
| 6,878,295 B1 * | 4/2005 | Hubenthal et al. ...... | 210/523 |
| 2004/0222170 A1 * | 11/2004 | Hauge et al. ........... | 210/803 |

FOREIGN PATENT DOCUMENTS

| | | |
|---|---|---|
| CA | 2 219 053 | 11/1997 |
| DE | 19507172 | 8/1996 |
| FR | 2636669 | 3/1990 |
| GB | 2 197 648 | 5/1988 |

OTHER PUBLICATIONS

Canon, Frank, "Drilling Fluids Wtih Solids Removal Systems," www.surfacetosurface.com/Support.
"Drilling Rig and Ancillaries," Petroleum Industry Training Service, Drilling Engineering vol. 1, 1995, c.3, pp. 125-152.
"Drilling Fluids," Petroleum Industry Training Service, Drilling Engineering vol. 1, 1995, c.4, pp. 63-82.

* cited by examiner

*Primary Examiner*—Christopher Upton
(74) *Attorney, Agent, or Firm*—Rodman & Rodman; Terrence N. Kuharchuk

(57) ABSTRACT

A method and a settling tank for use in separating a solids containing fluid, such as a drilling fluid. The settling tank includes a settling compartment comprised of an inlet and an upper outlet so that the fluid passes through the settling compartment generally in a first direction from the inlet toward the upper outlet. Further, a backwash fluid source directs a backwash fluid within the settling compartment generally in a second direction which is substantially opposite to the first direction. The method includes the steps of passing the fluid through the settling compartment generally in the first direction and directing the backwash fluid within the settling compartment generally in the second direction. Finally, a method is also provided for clarfying a solids containing fluid using a settling tank, wherein the settling tank is comprised of at least three isolatable settling compartments connected in series.

46 Claims, 18 Drawing Sheets

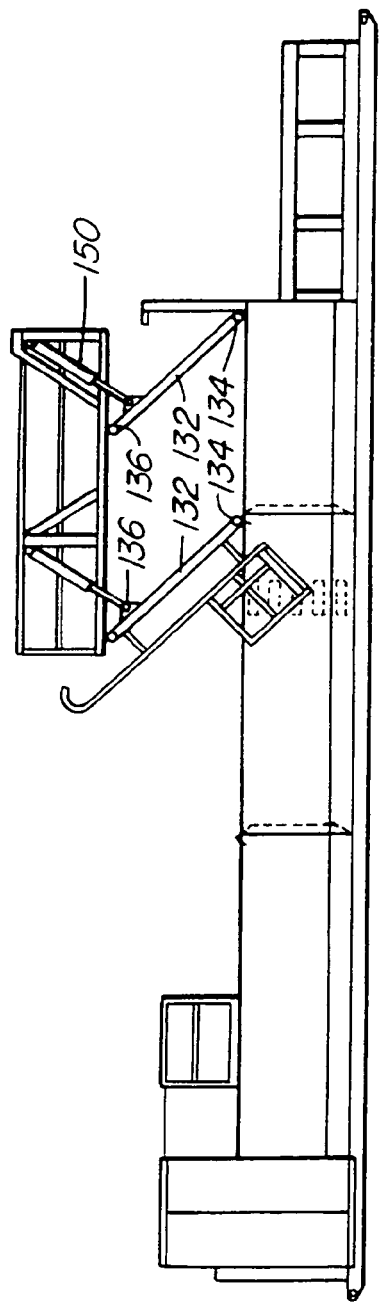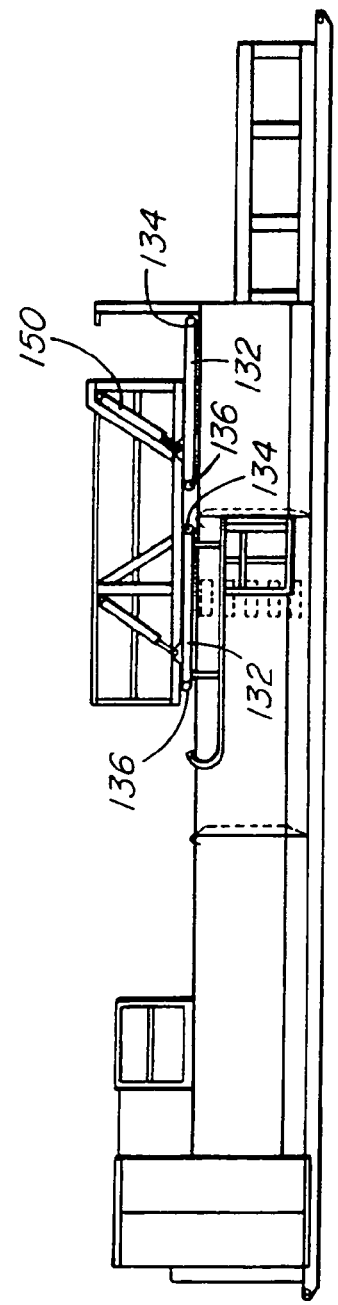

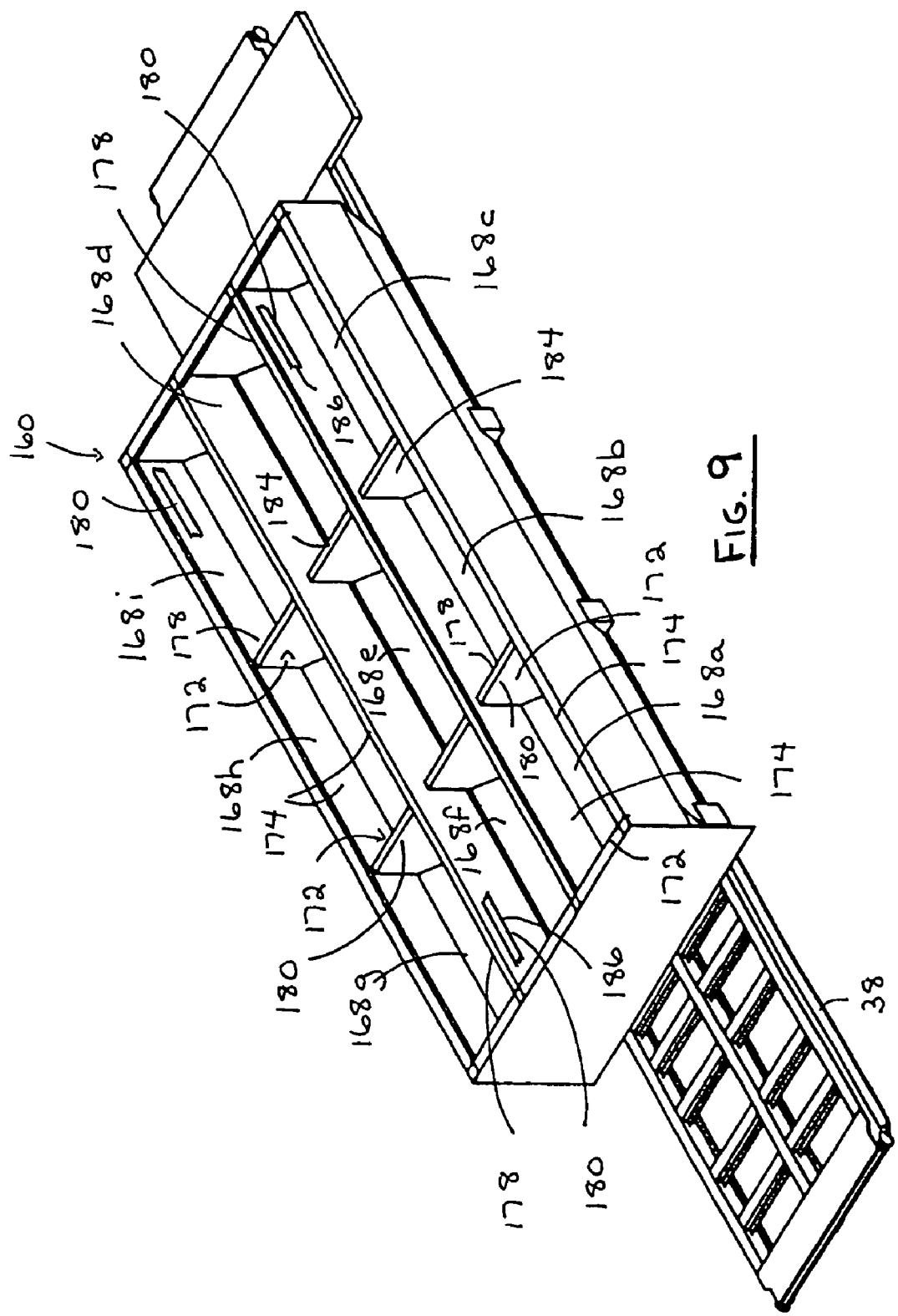

SETTLING TANK AND METHOD FOR SEPARATING A SOLIDS CONTAINING MATERIAL

FIELD OF THE INVENTION

This invention relates to apparatus for separating solids from fluids. In particular, the apparatus is useful for removing solids from drilling fluids used in well drilling operations. Further, this invention relates to a settling tank for use in separating a solids containing fluid, a method of separating a solids containing fluid and a method of clarifying a solids containing fluid using a settling tank.

BACKGROUND OF THE INVENTION

Wells for recovering oil, gas and the like are typically created by drilling into an underground source using a hollow drill string supported in a drilling rig. The drill string includes a drill bit at the lower end that is rotated into the ground to create a wellbore. As the drill bit is rotated, drilling fluid is pumped down through the interior of the drill string to pass through the bit and return to the surface in the wellbore external to the drill string. The drilling fluid acts to lubricate the drill bit and carries the loose solids created by the drill bit to the surface. At the surface, the used drilling fluid is collected and recycled by removing some or all of the solids. The viscosity or solids content of the drilling fluid can be varied depending on the stage of the drilling process and the location of the drill bit below the surface.

Equipment and methods for handling the drilling fluid to remove solids in order to recycle the fluid are well known. Settling tanks, shale shakers, flocculating tanks and centrifuge or cyclone separators can be interconnected to handle the drilling fluids from a drill site and separate the used drilling fluid and undesirable solids for subsequent recycling of the drilling fluid. Canadian Patent No. 2,219,053 issued May 25, 1999 to Grand Tank (International) Inc. discloses an arrangement of settling tanks and centrifuges to achieve this result.

Presently, a mud storage tank to hold drilling fluid and a shale shaker to perform screening of larger solids tend to be standard equipment for a drilling rig. In normal well site operation, drilling fluid is circulated out of the a borehole and passed over a shale shaker which is a screen to separate large solid particles from the drilling fluid. The shale shaker is generally positioned directly above the mud storage tank. The rest of the equipment for solids handling including a settling tank, a shale bin for collecting solids for disposal, centrifuges and a flocculent tank tends to be available as individual pieces of equipment that must be delivered to the well site in separate loads. It is important to choose compatible equipment that is interconnectable and that is properly sized to be of appropriate capacity to work with other selected equipment. Once delivered to the site, the various pieces of equipment must be assembled together. Generally, a picker truck is needed to lift the centrifuge equipment onto a conventional raised centrifuge stand. It requires superior organization and scheduling skills to ensure the components of a solids handling system are delivered in a timely manner to the work site and assembled into an efficient and reliable solids handling system.

Thus, there is a need in the industry for a solids handling system for drilling fluid at a well site that avoids the logistical and assembly problems of the prior art.

Further, there is a need in the industry for an improved settling tank for use in separating a solids containing fluid, such as drilling fluid, which may or may not be used as a component of a solids handling system. Additionally, there is a need for an improved method of separating and/or clarifying the solids containing fluid.

SUMMARY OF THE INVENTION

The present invention provides a self-contained apparatus for cleaning drilling fluids that is mountable on a platform for convenient transport by a conventional truck trailer between well sites as a single load. The components of the apparatus are sized and positioned to operate together in an efficient manner under various working configurations in which some or all of the components are used depending on the stage of the well being drilled.

Accordingly, in a first aspect of the present invention, the invention provides a transportable drilling fluid cleaning system for removing solids from drilling fluid at a drill site comprising:
  (a) a platform for transporting the cleaning system to a drill site;
  (b) a bin region on the platform to retain solids from the drilling fluid;
  (c) a settling tank on the platform having an inlet chamber to receive drilling fluid and at least one other chamber, the settling tank acting to separate the drilling fluids into an upper fluid fraction having a reduced concentration of solids and a lower solids fraction having a higher concentration of solids as the drilling fluid flows from the inlet chamber to at least one other chamber; and
  (d) a stand on the platform to support at least one centrifuge for separating the solids from the drilling fluid, the stand being movable between a stored position during transport of the platform and an operating position.

The platform is preferably in the form of a skid sized to be readily transportable on a conventional truck semi-trailer. The maximum dimensions for a loaded trailer in the province of Alberta, Canada to permit navigation on roads and highways are a length of about 63 feet, a width of about 12.5 feet and a height of about 17.5 feet. The components of the present invention are sized to take maximum advantage of these dimensions.

In a second aspect of the present invention, the invention provides apparatus for removing solids from a fluid/solid mixture comprising, in combination:
  (a) a platform;
  (b) a region defined on the platform to retain solids;
  (c) a settling tank on the platform having at least an inlet chamber for receiving the mixture and an outlet chamber, the settling tank acting to separate the mixture into an upper fluid fraction and a lower solids fraction as the mixture flows from the inlet chamber to the outlet chamber; and
  (d) at least one centrifuge on the platform in fluid communication with the settling tank and movable between a stored position and an operating position.

In a preferred arrangement, a flocculent source is also provided on the platform for adding a flocculating agent to the drilling fluid to promote removal of solids from the drilling fluid.

In a third aspect of the present invention, the invention is comprised of an improved settling tank for use in separating a solids containing fluid. The improved settling tank may comprise a portion or component of the transportable drilling fluid cleaning system or apparatus for removing solids of the present invention, as described above. However, alternately, the improved settling tank may be either used in combination with other compatible systems or components, or it may be used independently or apart from any other system or apparatus, such that the settling tank functions as an individual or "stand-alone" device.

Further, the settling tank is for use in separating a solids containing fluid. The solids containing fluid may be comprised of any fluid including a portion or percentage of solid material therein. Preferably, the solids containing fluid is comprised of a drilling fluid or a fluid/solid mixture as described above.

As well, the solids containing fluid is preferably separated by the settling tank into a lower separated fraction and an upper separated fraction. The upper and lower separated fractions may each be comprised of any portion or components of the solids containing fluid capable of settling apart or separating within the settling tank. However, in the preferred embodiment, wherein the settling tank is particularly used for separating a drilling fluid or a fluid/solid mixture, the lower separated fraction of the solids containing fluid is comprised of the lower solids fraction, while the upper separated fraction of the solids containing fluid is comprised of the upper fluid fraction.

More particularly, in the third aspect of the invention, the invention provides a settling tank for use in separating a solids containing fluid, the settling tank comprising a settling compartment, the settling compartment comprising:

(a) an inlet and an upper outlet so that the fluid passes through the settling compartment generally in a first direction from the inlet toward the upper outlet; and (b) a backwash fluid source for directing a backwash fluid within the settling compartment generally in a second direction which is substantially opposite to the first direction.

As indicated, the settling tank is comprised of a settling compartment. The settling compartment may have any dimensions, shape or configuration compatible with its use as described herein. Preferably, the dimensions, shape and configuration of the settling tank are adapted to facilitate the separation of the solids containing fluid into an upper separated fraction and a lower separated fraction, which may also be referred to herein in the preferred embodiment as the upper fluid fraction and lower solids fraction. Further, the dimensions, shape and configuration of the settling tank are also preferably adapted to facilitate the flow of the solids containing fluid in the first direction and the flow of the backwash fluid in the second direction. Finally, where desired, the dimensions, shape and configuration of the settling tank are selected to be compatible for use as a component of the transportable drilling fluid cleaning system or the self-contained apparatus for removing solids.

Further, as stated, the settling compartment is comprised of an inlet and an upper outlet. The inlet and the upper outlet may be positioned at any location within or on the settling compartment permitting the solids containing fluid to pass through the settling compartment in the first direction from the inlet toward the upper outlet. A reference to the flow or passage of the solids containing fluid in the first direction is intended to include the flow or passage of the solids containing fluid generally or substantially in the first direction. In other words, for the most part, the solids containing fluid passes in the first direction, although, it is understood that a smaller portion or part of the solids containing fluid may not flow in the first direction.

Further, the inlet may be comprised of any structure or mechanism capable of delivering the solids containing fluid to the settling compartment in the desired manner. In the preferred embodiment, the inlet is comprised of a pipe, weir, baffle or other suitable structure for conducting the solids containing fluid therethrough to the settling compartment. For instance, the inlet may be defined by a weir or baffle at one end of the settling compartment such that the solids containing fluid passes over the weir or baffle to enter the settling compartment.

Similarly, the upper outlet may be comprised of any structure or mechanism permitting at least a portion of the upper separated fraction of the solids containing fluid to pass therethrough in order to exit from the settling compartment. For instance, the upper outlet may be comprised of a slit or orifice defined through a sidewall of the settling compartment. Further, the upper outlet may be defined by a weir or baffle at one end of the settling compartment such that the upper separated fraction passes over the weir or baffle to exit the settling compartment.

The settling compartment is further comprised of the backwash fluid source. The backwash fluid source may be positioned at any location within or on the settling compartment permitting the backwash fluid source to direct the backwash fluid within the settling compartment in the second direction or substantially opposite to the first direction. A reference to the direction, flow or passage of the backwash fluid in the second direction is intended to include the direction, flow or passage of the backwash fluid generally or substantially in the second direction. In other words, for the most part, the backwash fluid is directed or passes in the second direction, although, it is understood that a smaller portion or part of the backwash fluid may not be directed or flow in the second direction.

In addition, the backwash fluid source may be configured to direct the backwash fluid in the second direction in any plane opposite to the first direction. However, preferably, the backwash fluid source is configured so that the backwash fluid is directed substantially horizontally from the backwash fluid source.

The backwash fluid is directed in the manner described above in order to provide a flow of the backwash fluid in a direction opposite to the flow of the solids containing fluid. The circulation of the backwash fluid backwards or in a direction against the solids containing fluid is believed to provide the following effects. First, the counter-current flow of the backwash fluid causes a rolling action of the solids containing fluid in the settling compartment. In order to enhance the rolling action and to reduce any agitation or stirring of the solids settled within the settling compartment, the backwash fluid is provided under relatively low flow conditions as compared with the solids containing fluid. Specifically, the backwash fluid is directed into the settling compartment under substantially laminar flow conditions, as described in further detail below. Second, the counter-current flow of the backwash fluid increases the residence time of the solids containing fluid within the settling tank, which may enhance the settling of the solids therein.

The backwash fluid source may be comprised of any mechanism, device or structure capable of, and suitable for, directing the backwash fluid in the desired direction within the settling compartment as described herein. However, in the preferred embodiment, the backwash fluid source is comprised of a nozzle.

Preferably, the settling compartment is further comprised of a lower end and wherein the backwash fluid source is positioned adjacent to the lower end of the settling compartment. In other words, the backwash fluid source is preferably positioned beside or in relatively close proximity to the lower end while still permitting the proper functioning of the backwash fluid source. In the preferred embodiment, the backwash fluid source is positioned less than about three inches from the lower end of the settling compartment.

The settling compartment is also preferably further comprised of a lower outlet located adjacent to the lower end of the settling compartment. The lower outlet may be comprised of any structure or mechanism permitting the lower separated fraction to be withdrawn from the settling compartment therethrough. In the preferred embodiment, the lower outlet is comprised of a drain and/or an associated sump.

Further, the lower outlet may be positioned at any location within the settling compartment adjacent to the lower end thereof. However, the lower outlet is preferably positioned at a location in the settling compartment at which the most settling of the solids is likely to occur. In the preferred embodiment, the lower outlet is particularly located about between the inlet and the backwash fluid source so that the backwash fluid source directs the backwash fluid generally toward the lower outlet. Again, a reference to the direction, flow or passage of the backwash fluid toward the lower outlet is intended to include the direction, flow or passage of the backwash fluid generally or substantially toward the lower outlet. In other words, for the most part, the backwash fluid is directed or passes toward the lower outlet, although, it is understood that a smaller portion or part of the backwash fluid may not be directed or flow toward the lower outlet. Thus, the backwash fluid also acts to push or direct any solids settling within the settling compartment towards the lower outlet to be withdrawn therethrough.

Further, the settling compartment may be configured to facilitate the action or function of the backwash fluid source. For instance, the settling compartment is preferably comprised of a sidewall and wherein the sidewall is sloped so that the settling compartment narrows toward the lower end of the settling compartment. As a result, the direction of the backwash fluid toward the lower outlet is facilitated, amongst other advantages. For instance, the sloping of the sidewall may also facilitate the removal of any lower separated fraction from the settling tank through the lower outlet.

In addition, the settling tank may be further comprised of a solids removal pipe in communication with the lower outlet, for withdrawing a lower separated fraction from the settling compartment. As well, the settling tank may be further comprised of a backwash fluid pipe in communication with the backwash fluid source, for supplying the backwash fluid to the backwash fluid source.

As indicated, the settling tank may be comprised of a single settling compartment as described above. However, in the preferred embodiment, the settling tank is comprised of a plurality of the settling compartments connected in series. Within each compartment, the solids containing fluid is further separated into an upper separated fraction and a lower separated fraction. The upper separated fraction tends to have relatively less solids therein as compared with the lower separated fraction. In other words, the upper separated fraction tends to have a relatively smaller percentage of solids, or a relatively lower or reduced concentration of solids, than the lower separated fraction. The lower separated fraction tends to be directed out of the lower outlet within each settling compartment, while the upper separated fraction tends to be directed into the next settling compartment connected in series. As a result, as the solids containing fluid passes through each of the settling compartments in series, the portion or percentage of solids comprising the solids containing fluid is reduced.

The plurality of settling compartments may be configured or arranged in series in any manner permitting the proper functioning of each of the settling compartments. For instance, each of the settling compartments may be comprised of two ends and wherein the settling compartments are configured to provide a plurality of the settling compartments arranged end to end in a column. Alternately, each of the settling compartments may be comprised of two sides and wherein the settling compartments are configured to provide a plurality of the settling compartments arranged side by side in a row.

Preferably, the settling compartments are configured to provide a plurality of adjacent columns of the settling compartments. Any number of desired settling tanks may be configured or arranged in series. The particular number will be selected depending upon, amongst other factors, the composition of the solids containing fluid initially entering the settling tank and the desired or acceptable percentage or proportion of solid material in the solids containing fluid exiting the settling tank. However, in the preferred embodiment, the settling tank is comprised of nine settling compartments and wherein the settling compartments are configured to provide three columns of the settling compartments and three of the settling compartments in each of the columns.

Where the settling tank is comprised of a plurality of settling compartments, the settling tank may be further comprised of a solids removal pipe assembly in communication with each of the lower outlets, for withdrawing a lower separated fraction from each of the settling compartments. As well, the settling tank may be further comprised of a backwash fluid pipe assembly in communication with each of the backwash fluid sources, for supplying the backwash fluid to the backwash fluid sources.

To provide flexibility with respect to the use and operation of the settling tank, it is desirable that each of the settling compartments of the settling tank be capable of independent actuation or functioning. Thus, each of the settling compartments is preferably capable of being selectively utilized when desired or required to achieve a particular desired result or functioning of the settling tank. For instance, depending upon the initial composition of the solids containing fluid and the desired solids separation of the settling tank, it may be desirable to increase or decrease the number of settling compartments to be used in series.

To provide an amount of flexibility in the use of the settling tank, the lower outlet of at least one settling compartment may be provided with an actuatable lower outlet valve so that the lower outlet may be selectively opened and closed. Alternately, or in addition, the backwash fluid sources of at least one settling compartment may be provided with an actuatable backwash fluid source valve so that the backwash fluid source may be selectively opened and closed. However, preferably, each of the lower outlets is provided with an actuatable lower outlet valve so that each of the lower outlets may be selectively opened and closed and each of the backwash fluid sources is provided with an actuatable backwash fluid source valve so that each of the backwash fluid sources may be selectively opened and closed.

The lower outlet valves may be configured so that the lower outlet valves are operable together or actuated as a unit. Thus, all of the lower outlets may be concurrently opened or closed. Similarly, the backwash fluid source valves may be configured so that the backwash fluid valves are operable together or actuated as a unit. Thus, all of the backwash fluid sources may be concurrently opened or closed. Alternately, the lower outlet valve and the backwash fluid valve of each settling compartment may be configured to be operable together or actuated as a unit. Thus, the lower outlet and the backwash fluid source of the particular settling compartment may be concurrently opened or closed.

However, in the preferred embodiment, the lower outlet valves and the backwash fluid source valves are configured so that each of the lower outlets and each of the backwash fluid sources may be independently opened and closed. Thus, the lower outlet and the backwash fluid source of each settling compartment may be selectively and independently opened and closed in any desired combination.

As a result, the flow of backwash fluid into each settling compartment may be independently controlled. Similarly, the flow of the lower separated fraction from the lower outlet of each settling compartment may be independently controlled. Accordingly, the height of the solids containing fluid in each settling compartment may be independently controlled, providing control over the flow of the upper separated fraction from the upper outlet of each settling compartment. Further, each of the settling compartments is isolatable. In other words, each of the settling compartments is capable of being isolated or separated from the other settling compartments in the settling tank. In addition, if desired, any selected settling compartment may be bypassed. Thus, each settling compartment may be used only as desired or required by the operator of the settling tank.

Further, the settling tank may be further comprised of a pipe manifold, wherein both the solids removal pipe assembly and the backwash fluid pipe assembly are connected with the pipe manifold. As indicated above, the solids removal pipe assembly communicates with each of the lower outlets for withdrawing the lower separated fraction from each of the settling compartments. The backwash fluid pipe assembly communicates with each of the backwash fluid sources for supplying the backwash fluid to the backwash fluid sources.

The backwash fluid may be comprised of any fluid compatible for use with the solids containing fluid and suitable for use in the settling compartments. Further, the backwash fluid may be provided from any supply source. For instance, a primary or supplementary supply of the backwash fluid may be operatively connected with the settling tank, and particularly with the backwash fluid pipe, backwash fluid pipe assembly or pipe manifold, for providing the backwash fluid.

However, preferably, the backwash fluid is comprised of a recycled portion of one or more of the fluids within or passing through the settling tank. In particular, the backwash fluid is preferably comprised of all or a portion of the lower separated fraction withdrawn from the lower outlet of one or more settling compartments. In other words, at least a portion of the lower separated fraction withdrawn from the lower outlet of at least one settling compartment is recycled or returned to the backwash fluid source as the backwash fluid. Preferably, the backwash fluid provided to a particular settling compartment is comprised of at least a portion of the lower separated fraction withdrawn from the lower outlet of a subsequent settling compartment in series. Preferably, the percentage or proportion of solids in the backwash fluid being directed into the settling compartment is less than the percentage or proportion of solids in the lower separated fraction being withdrawn from that same settling compartment.

In order to control the flow of backwash fluid to the desired settling compartment, and thus further enhance the flexibility with respect to the operation and functioning of the settling tank, the pipe manifold is preferably provided with a plurality of actuatable manifold valves which may be actuated in order to supply the backwash fluid to the backwash fluid sources from the lower outlets. Alternately, the manifold valves may be actuated in order to supply the backwash fluid to the backwash fluid sources from an alternate primary or supplementary supply of backwash fluid which is connected with the pipe manifold.

The manifold valves may be configured so that the manifold valves are operable together or actuated as a unit. Thus, all of the manifold valves may be actuated to concurrently supply all of the backwash fluid sources. Alternately, each manifold valve may be configured so that the specific manifold valve may be independently actuated to supply one or more selected backwash fluid sources.

In the preferred embodiment, the lower outlet valves, the backwash fluid source valves and the manifold valves are configured so that they may be actuated in order to supply the backwash fluid to one or more selected backwash fluid sources from one or more selected lower outlets.

Further, the settling tank may be further comprised of a solids transport pipe assembly, wherein the solids transport pipe assembly is connected with the pipe manifold. The solids transport pipe assembly may be provided for conducting all or a portion of the lower separated fraction of the solids containing fluid for further processing. Preferably, the solids transport pipe assembly is adapted to connect the pipe manifold with at least one centrifuge.

Finally, the settling tank may include one or more pumps for conducting the various fluids through one or more of the backwash fluid sources and the solids transport pipe assembly. Preferably, the settling tank is further comprised of a plurality of pumps associated with the pipe manifold, for supplying the backwash fluid to the backwash fluid sources and for supplying the lower separated fractions to the solids transport pipe assembly. In the preferred embodiment, the pipe manifold and the pumps are configured so that each of the pumps may be selectively and independently operated to supply the backwash fluid only to the backwash fluid sources, to supply the lower separated fractions only to the solids transport pipe assembly, or both to supply the backwash fluid to the backwash fluid sources and supply the lower separated fractions to the solids transport pipe assembly.

In a fourth aspect of the invention, the invention is comprised of a method of separating a solids containing fluid, preferably a drilling fluid or a fluid/solid mixture, as discussed above. Although the separating method may be performed using any settling mechanism, separation equipment or settling tank compatible with, and suitable for, performing the separating method as described herein, the method is preferably performed using the improved settling tank of the present invention, as described herein.

More particularly, in the fourth aspect of the invention, the invention provides a method of separating a solids containing fluid, comprising the following steps:
  (a) passing the fluid through a first settling compartment generally in a first direction; and
  (b) directing a backwash fluid within the first settling compartment generally in a second direction which is substantially opposite to the first direction.

As discussed above, the backwash fluid is directed in the described manner in order to provide a flow of the backwash fluid generally in a direction opposite to the flow of the solids containing fluid. The circulation of the backwash fluid backwards or in a direction against the solids containing fluid is believed to provide the effects outlined above. In order to enhance the desired effects and to facilitate the rolling action of the solids containing fluid, the backwash fluid is preferably directed within the settling compartment under substantially laminar flow conditions.

Further, the fluid is passed at a fluid flowrate, the backwash fluid is directed at a backwash fluid flowrate, and wherein the backwash fluid flowrate is preferably substantially less than the fluid flowrate. More particularly, the backwash fluid flowrate is preferably less than about fifty percent of the fluid flowrate, and more preferably, the backwash fluid flowrate is less than about twenty percent of the fluid flowrate. In the preferred embodiment, the backwash fluid flowrate is about ten percent of the fluid flowrate.

In addition, the first direction of the solids containing fluid and the second direction of the backwash fluid may be in any plane so long as the directions are substantially opposite to each other. However, preferably, the first direction is a substantially horizontal direction and the second direction is a substantially horizontal direction.

Further, the method is preferably further comprised of the step of withdrawing an upper separated fraction from an upper outlet associated with the first settling compartment. In addition, the method is preferably further comprised of the step of withdrawing a lower separated fraction from a lower outlet located adjacent to a lower end of the first settling compartment.

Further, the backwash fluid directing step is preferably comprised of directing the backwash fluid adjacent to a lower end of the first settling compartment. In addition, the method is preferably further comprised of the step of moving a lower separated fraction of the fluid toward a lower outlet located adjacent to the lower end of the first settling compartment. The step of moving the lower separated fraction toward the lower outlet may be comprised of the step of directing the backwash fluid adjacent to the lower end of the first settling compartment. Thus, the backwash fluid may move the solids settling within the settling compartment, comprising the lower separated fraction, towards the lower outlet for withdrawal therefrom.

In the preferred embodiment of the method, the method is further comprised of the following steps:

(c) withdrawing an upper separated fraction from an upper outlet associated with the first settling compartment;

(d) passing the upper separated fraction through a subsequent settling compartment generally in a first direction; and (e) directing the backwash fluid within the subsequent settling compartment generally in a second direction which is opposite to the first direction.

The method may further comprise repeating steps (c), (d) and (e) in a plurality of subsequent settling compartments. In the preferred embodiment, the method further comprises repeating steps (c), (d) and (e) in eight subsequent settling compartments.

As described previously, the backwash fluid is preferably directed within the first settling compartment and each of the subsequent settling compartments under substantially laminar flow conditions. The same preferred flowrate conditions are application in each subsequent settling compartment as outlined previously for the first settling compartment. Similarly, as described previously, the first direction in the first settling compartment and each of the subsequent settling compartments is a substantially horizontal direction and wherein the second direction in the first settling compartment and each of the subsequent settling compartments is a substantially horizontal direction.

As well, the method is preferably further comprised of the step of withdrawing a lower separated fraction from at least one of the subsequent settling compartments and directing the lower separated fraction within the first settling compartment or an earlier one of the subsequent settling compartments as the backwash fluid.

The backwash fluid directing step in the first settling compartment and each of the subsequent settling compartments is preferably comprised of directing the backwash fluid adjacent to a lower end of the settling compartment. In addition, the method is preferably further comprised of the step in the first settling compartment and each of the subsequent settling compartments of moving a lower separated fraction toward a lower outlet located adjacent to the lower end of the settling compartment. The step of moving the lower separated fraction toward the lower outlet in the first settling compartment and each of the subsequent settling compartments may be comprised of the step of directing the backwash fluid adjacent to the lower end of the settling compartment. Thus, the backwash fluid may move the solids settling within each settling compartment, comprising the lower separated fraction therein, towards the lower outlet of each settling compartment for withdrawal therefrom.

Finally, in a fifth aspect of the present invention, the invention is comprised of a method of clarifying a solids containing fluid, preferably a drilling fluid or a fluid/solid mixture, using a settling tank. The settling tank may be comprised of any settling mechanism, separation equipment or form of settling tank compatible with, and suitable for, performing the clarifying method. However, preferably, the clarifying method is preferably performed using the improved settling tank of the present invention, as described herein.

More particularly, in the fifth aspect of the invention, the invention provides a method of clarifying a solids containing fluid using a settling tank, wherein the settling tank is comprised of at least three isolatable settling compartments connected in series, the method comprising the following steps:

(a) providing a substantially empty second settling compartment, wherein the second settling compartment is located between a first settling compartment and a third settling compartment;

(b) substantially emptying the third settling compartment of a solids containing fluid;

(c) combining a clarifying fluid from the first settling compartment with the solids containing fluid from the third settling compartment in order to provide a combined fluid;

(d) introducing the combined fluid into a centrifuge;

(e) allowing the combined fluid to separate in the centrifuge into a centrifuge fluid fraction and a centrifuge solids fraction;

(f) returning the centrifuge fluid fraction to the first settling compartment as the clarifying fluid; and (g) allowing a portion of the centrifuge fluid fraction to pass from the first settling compartment to the second settling compartment so that the first settling compartment and the second settling compartment both contain the clarifying fluid and so that the third settling compartment is substantially empty.

The clarifying fluid may be comprised of any fluid suitable for, and capable of, facilitating or enhancing the clearing, cleaning or purifying of the solids containing fluid. In the preferred embodiment, the clarifying fluid is comprised of water and a flocculent.

BRIEF DESCRIPTION OF THE DRAWINGS

Aspects of the present invention are illustrated, merely by way of example, in the accompanying drawings in which:

FIG. 9 is a pictorial view of an alternate preferred embodiment of a settling tank for use in the transportable drilling fluid cleaning system of the invention;

DESCRIPTION OF THE PREFERRED EMBODIMENTS

Figure 1:
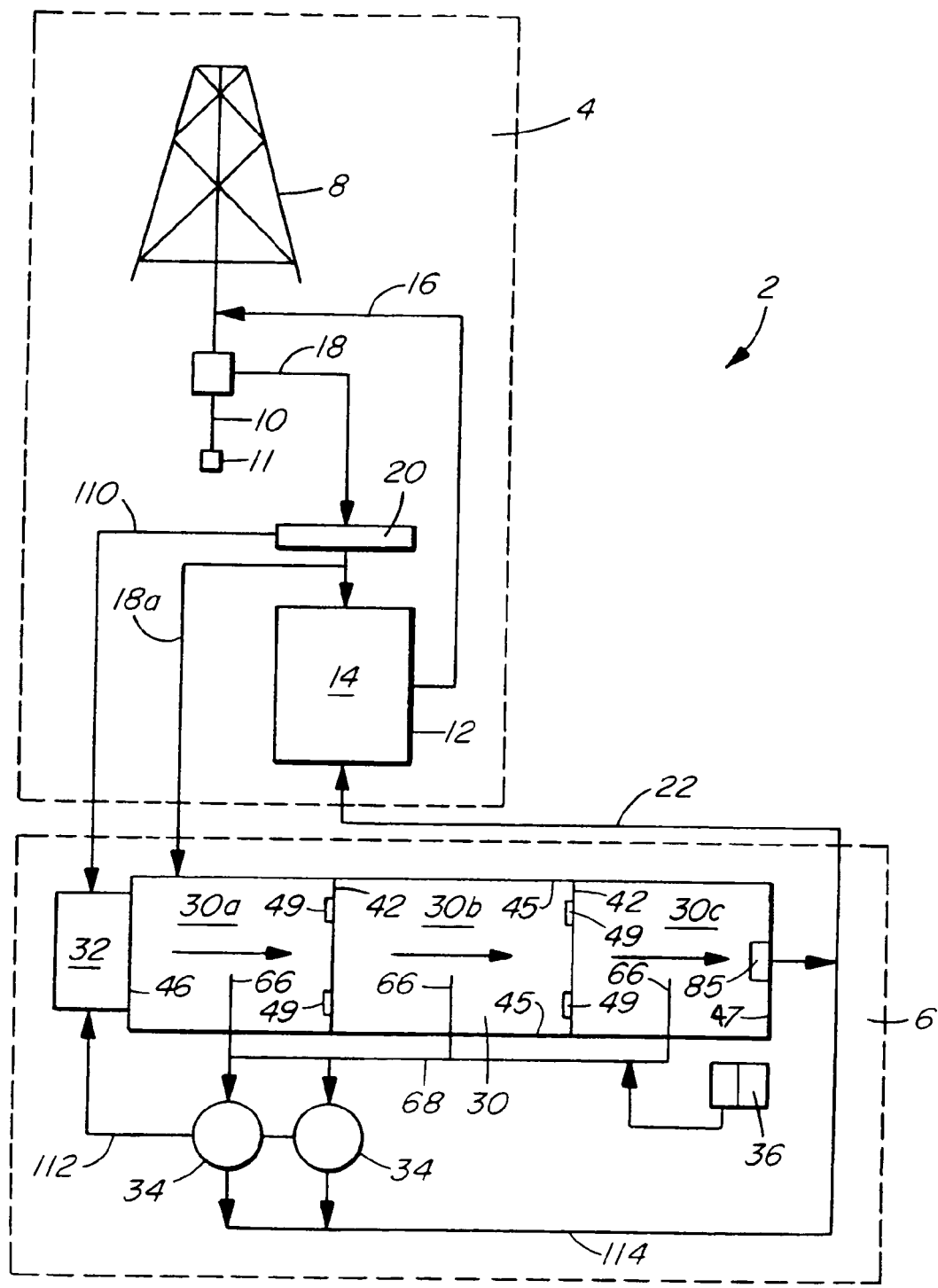
FIG. 1 is a schematic view of a drilling system incorporating the transportable drilling fluid cleaning system of the present invention.

Referring to FIG. 1, there is shown a schematic view of a well drilling system 2 which includes a drill rig 4 and a transportable drilling fluid cleaning system 6 according to the present invention. Drill rig 4 includes a drill derrick 8 supporting a drill string 10 which is rotated to drill a wellbore into the ground. A tank 12 associated with drill rig 4 stores drilling fluid 14. The viscosity of drilling fluid 14 can be adjusted depending on the stage to which the wellbore is drilled. The apparatus of the present invention can be used to remove undesired solids from the drilling mud and to recycle the drilling fluid to tank 12 at a desired viscosity.

Drilling fluid 14 is pumped in a conventional manner through conduit 16 into drill string 10. Fluid 14 flows downwardly through the drill string to exit from the lower end of the string at bit 11. Drilling fluid 14 acts to lubricate the drill bit and collect cuttings created by the drilling action of the bit. The drilling fluid with additional solids flows upwardly in the wellbore externally to the drill string to be collected near the surface. The collected drilling fluid/solids mixture passes through conduit 18 to be delivered to shale shaker 20. Shale shaker 20 is a vibrating screen positioned above tank 12 that removes solids from the drilling fluid and delivers cleaned drilling fluid back to tank 12. Depending on the stage of drilling and the volume of drilling fluid being used, shaker 20 may be able to remove solids to an extent such that the drilling fluid simply drains through the shaker directly into tank 12 for re-use. In other cases, some or all of the drilling fluid that passes through shaker 20 is diverted via conduit 18a for delivery to the drilling fluid cleaning apparatus 6 of the present invention. Apparatus 6 removes solids from the drilling fluid 14 by settling, centrifuging or a combination of methods to deliver cleaned drilling fluid back to tank 12 via conduit 22.

Figure 2:
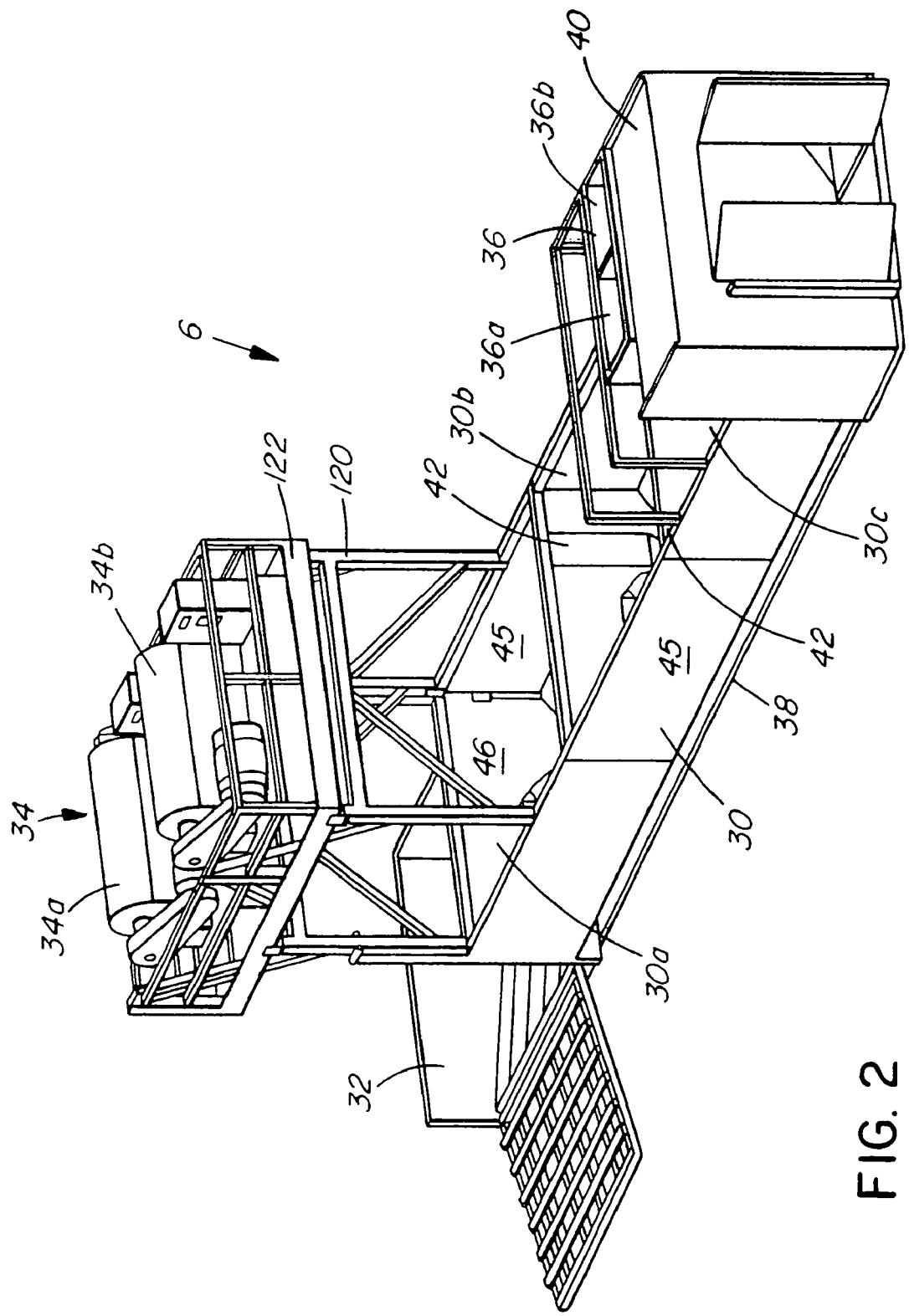
FIG. 2 is a perspective view of a preferred embodiment of the transportable drilling fluid cleaning system.

FIG. 2 shows a perspective view of a preferred embodiment of the transportable drilling fluid cleaning apparatus 6 of the present invention. The system includes a settling tank 30, a bin 32 to retain solids extracted from the drilling fluid, at least one centrifuge 34, and, optionally, a flocculent source 36. The above components are arranged on a platform, preferably in the form of a skid 38, to permit loading of the system onto a trailer towable by a truck for transport of all the components as a unit in a single trip by road between drilling sites. In the province of Alberta, Canada, where the inventors are based, skid 38 can be dimensioned to a maximum size of 63 feet long, 12.5 feet wide and 17.5 feet high in order to be transportable on roads and highways as a non-divisible load. A skid of this size requires a special permit for oil field hauling, however, a pilot vehicle to lead or follow the truck is not required. Skids of different sizes may be permitted in other jurisdictions.

Figure 3:
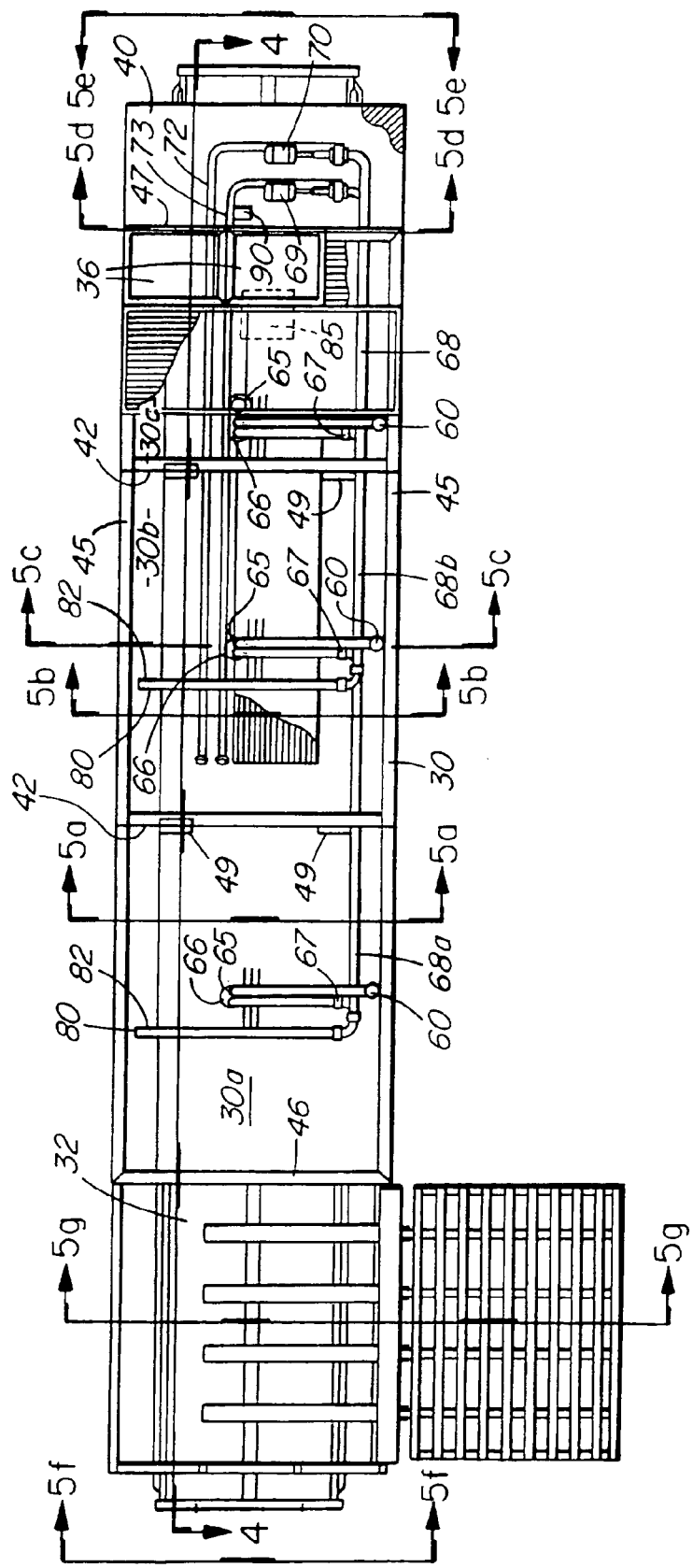
FIG. 3 is a top plan view of the cleaning system of FIG. 2.

FIG. 3 is a plan view of apparatus 6 with the centrifuges removed showing details primarily of settling tank 30. Settling tank 30 occupies the largest area on skid 38 extending over most of the length of the skid from bin 32 to an enclosure 40 housing at least one pump that acts to move drilling fluid from the settling tanks to the centrifuges of the apparatus. Settling tank 30 is divided into an inlet chamber 30a and at least one other chamber by baffle walls 42 that extend transversely between tank side walls 45 at intervals between end walls 46 and 47. In the illustrated embodiment, settling tank 30 is formed with three chambers: an inlet chamber 30a, an intermediate chamber 30b, and an end chamber 30c. Depending on the size of skid 38 and the solids content of the drilling fluid, additional or fewer chambers can be formed as will be apparent to a person skilled in the art. The chambers of the settling tank can be formed to be substantially equal in volume. If chambers of differing size are used, inlet chamber 30a may be the largest chamber as it experiences the largest solids load. By way of example, it is possible to construct a settling tank having a volume ranging between about 1050 to about 2100 cubic feet on a skid that is dimensioned to be transportable on roads by truck trailer. Such a tank can be divided into three equal chambers of about 350 to 700 cubic feet. The overall dimensions of such a settling tank are 40 feet long and 11.5 feet wide with the height being varied between about 2.5 feet and about 5 feet to accommodate the range of tank volumes.

Figure 4:
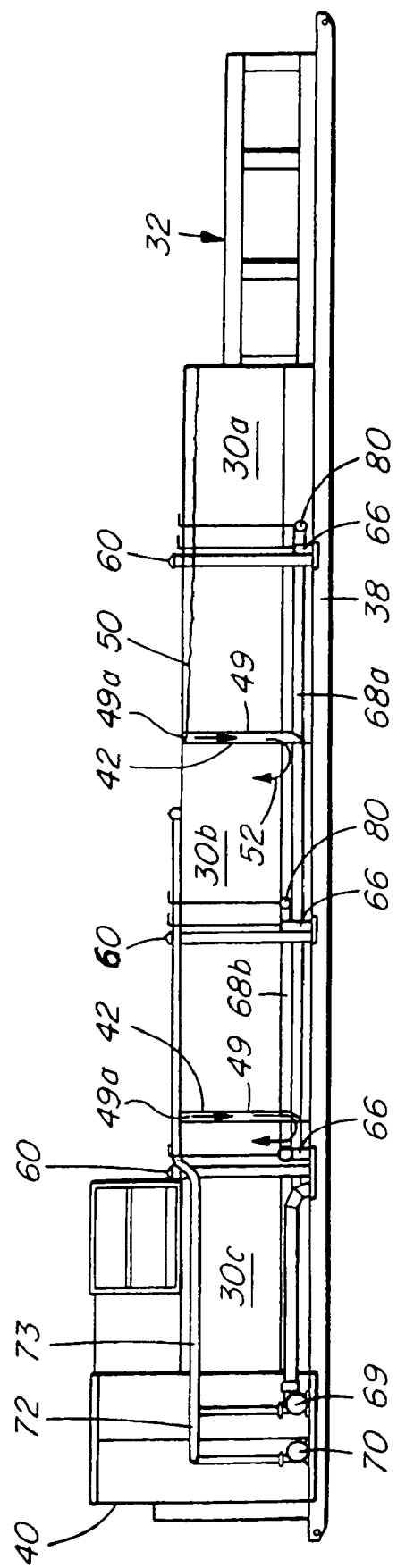
FIG. 4 is a longitudinal section view taken along line 4—4 of FIG. 3.

Inlet chamber 30a receives drilling fluid via conduit 18a as best shown in FIG. 1. Conduit 18a can be a large diameter hose from mud storage tank 12 through which drilling fluid 14 is pumped. As drilling fluid flows from inlet chamber 30a through the various additional chambers, settling tank 30 acting to separate the drilling fluid into an upper fluid fraction having a reduced concentration of solids and a lower solids fraction having a higher concentration of solids. Each baffle 42 is formed with at least one passage 49 formed thereon adapted to deliver drilling fluid that overflows into the passage from a first upstream chamber to adjacent a floor of a second downstream chamber. For example, as best shown in FIG. 4, which is a longitudinal section view taken along line 4—4 of FIG. 3, drilling fluid which fills chamber 30a to level 50 overflows into passage 49 adjacent baffle 42 and flows in the direction indicated by arrow 52 to emerge at the bottom of chamber 30b. Baffles 42 and passages 49 serve to slow the flow of drilling fluid through the chambers of settling tank 30 to allow solids in the drilling fluid time to settle due to gravity and concentrate toward the bottom of each chamber. Therefore, the drilling fluid at the top of each chamber tends to have a lower solids concentration, and it is this fluid that overflows to the next chamber with the result that the drilling fluid has less solids as it travels to downstream chambers. Inlet chamber 30a tends to have the greatest solids load while subsequent chambers see increasingly smaller loads.

As best shown in FIGS. 3 and 4, it is preferable that each baffle 42 includes two spaced, vertically aligned passages 49 although other arrangements are possible depending on the volume of fluid to be treated and the desired residence time in each chamber. Preferably, each passage 49 includes a cover 49a which is pivotable to seal or open the passage to control flow therethrough. Passages 49 are also shown in section view 5a taken along line 5a—5a of FIG. 3.

Referring to FIG. 3, each chamber of the settling tank includes a collection area or sump 65 in the floor of the chamber in which the lower solids fraction of the drilling fluid tends to concentrate. As best shown in FIGS. 5a–5e, the lower portion 45a of tank side walls 45 are preferably angled inwardly to direct settling solids to sump 65. Sump 65 provides a convenient location into which various conduits extend for collection of drilling fluid for further processing.

Figure 5A:
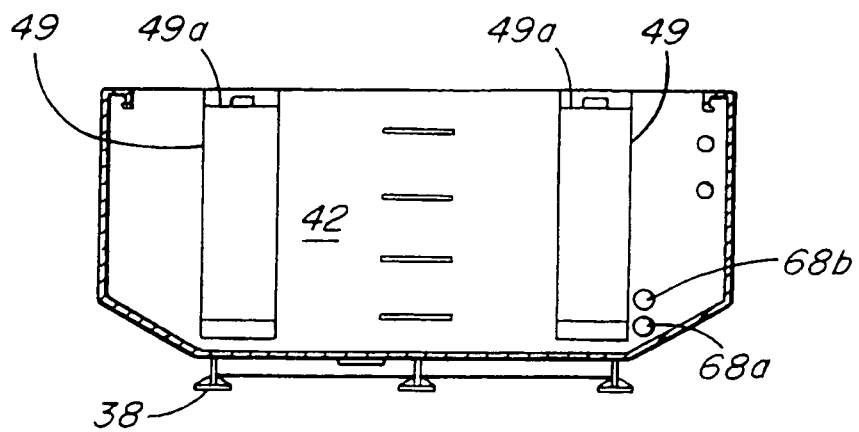
FIGS. 5a–5g are section views taken along the indicated section lines of FIG. 3 showing various details of the cleaning system.
Figure 5B:
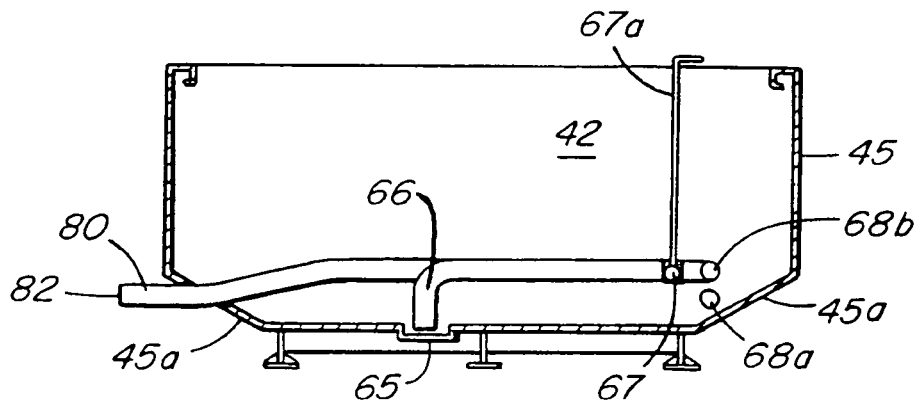

Adjacent each sump 65, there is an inlet 66 to a collection conduit 68 that preferably runs along a side wall 45 of the settling tank. FIG. 5b, which is a section taken along line 5b—5b of FIG. 3, shows in detail inlet 66 extending from sump 65 to collection conduit 68. Each inlet 66 includes a manually operable valve 67 to open or close the inlet. Valve 67 can be operated from above the settling tank by control 67a extending upwardly from the valve. FIG. 3 shows collection conduit 68 extending through baffles 42 to communicate sump 65 of each chamber with at least one pump located in pump enclosure 40 at the end of the skid. In the illustrated embodiment, enclosure 40 houses first and second pumps 69, 70, respectively, which act to collect the lower solids fraction of the drilling fluids from the chambers and deliver the fluid to the centrifuges for further solids separation. Drilling fluid is pumped to the centrifuges via lines 72,73 which extend generally along the longitudinal axis of skid 38 above settling tank 30 back to the platform that supports the centrifuges over inlet chamber 30a. Depending on the volume of drilling fluid to be handled only a single pump and/or centrifuge may be necessary.

Collection conduit 68 is preferably formed from two pipelines: a first pipeline 68a communicates inlet chamber 30a to first pump 69 and a second pipeline 68b communicates the remaining chambers 30b and 30c with second pump 70. As best shown in the section views of FIGS. 5a to 5e, pipelines 68a and 68b are preferably stacked vertically as they extend along the settling tank to pumps 69,70. Pipeline 68a and pump 69 service only inlet chamber 30a as this chamber experiences the greatest solids loads and will tend to require a dedicated centrifuge at the end of line 73. In contrast, intermediate chamber 30b and end chamber 30c, downstream from inlet chamber 30a, are subjected to progressively lesser solids loads since they are processing drilling fluid that has already had solids removed. Therefore, these subsequent chambers are adequately serviced by second pipeline 68b and pump 70 which feed the combined flows from chambers 30b and 30c to a second centrifuge via line 72.

Referring to FIG. 3 and FIG. 5b, depending on the solids load of the drilling fluid, some or all of the chambers of settling tank 30 may not be required. To accommodate this situation, at least one chamber of the settling tank preferably includes a bypass conduit 80 having an inlet 82 external to the tank that communicates with collection conduit 68a or 68b. Drilling fluid 14 from mud tank 12 would be pumped via a hose directly into a bypass conduit 80 to bypass the chamber and feed directly into the conduit 68 for delivering to the centrifuges. In the illustrated embodiment, inlet chamber 30a and intermediate chamber 30b are provided with bypass conduits 80.

Figure 5C:
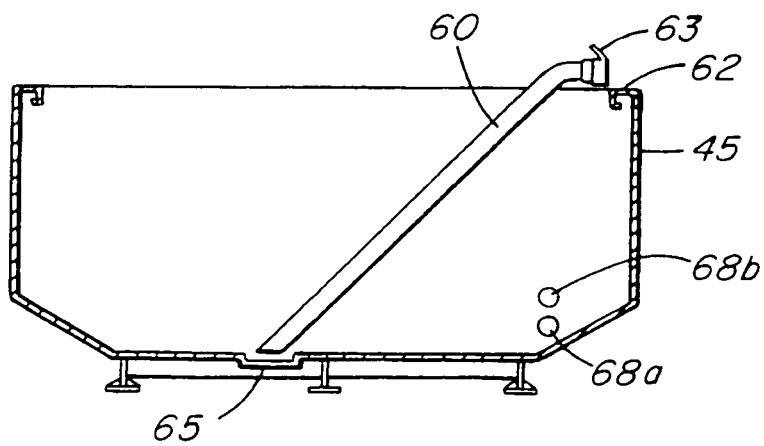

Referring to FIG. 3 and FIG. 5c, it is preferable that each chamber 30a, 30b and 30c of the settling tank include a drainage conduit 60 to permit drainage of drilling fluid from the chamber. FIG. 5c which is a section view taken along line 5c–5c of FIG. 3 shows a typical drainage conduit 60 which extends from the floor of the chamber adjacent sump 65 to the top edge 62 of side wall 45 of the settling tank. Each drain conduit 60 includes a terminal coupling 63 with a manually operable valve by which the conduit can be connected to a hose for withdrawing drilling fluid from the chamber. Drain conduits 60 are typically used to drain the chambers of the settling tank prior to moving the system of the present invention to a new drilling site.

Figure 5D:
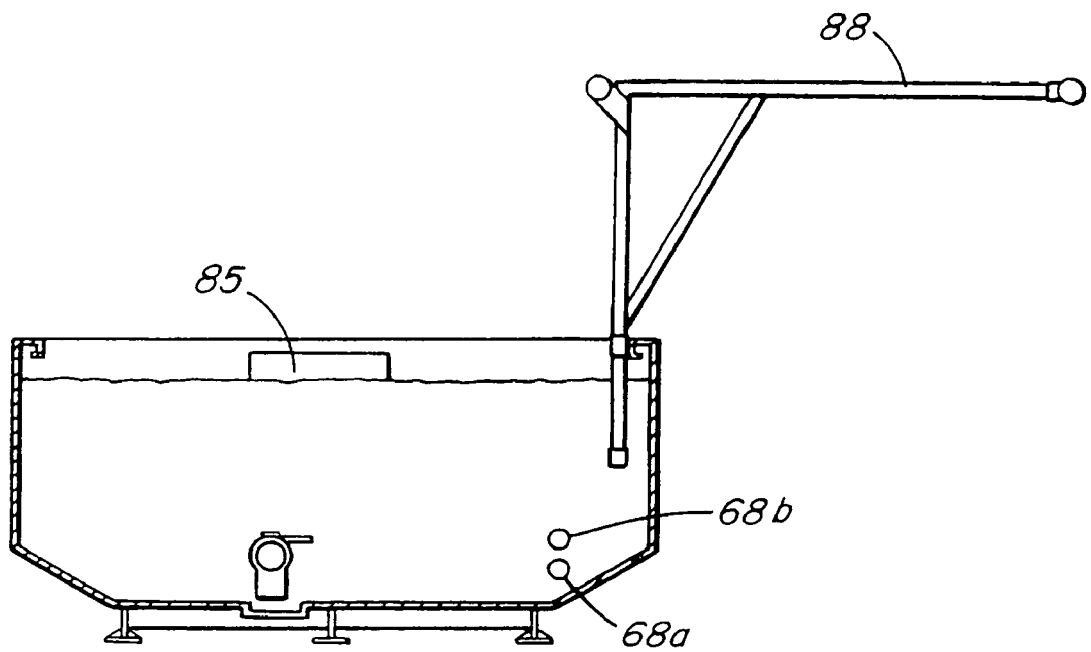

Drilling fluid that is cleaned within settling tank 30 needs to be pumped back to mud tank 12 via conduit 22 (FIG. 1) to complete one possible path of the solids removal cycle of the present invention. This pumping action is performed by at least one pump in the settling chamber. Preferably, the pump comprises a floating pump 85 situated in end chamber 30c as best shown in FIG. 5d which is a cross-section taken along line 5d–5d in FIG. 3. FIG. 5d also shows a pivoting boom structure 88 by which floating pump 85 can be lifted into and out of end chamber 30c.

Figure 5E:
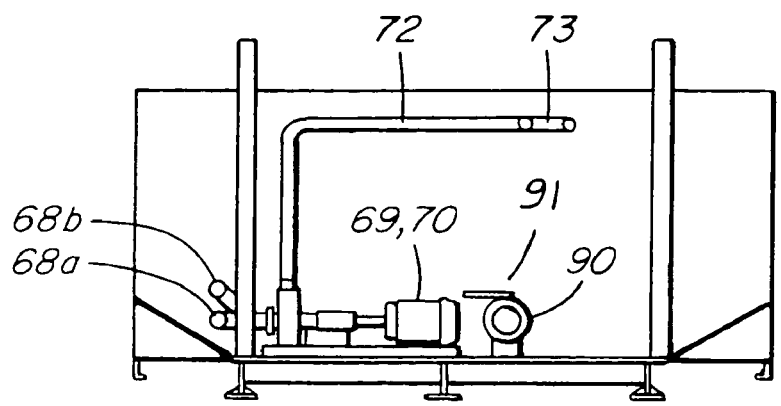

Depending on the volume of drilling fluid that requires recycling generated at a well site, it may be necessary to use more than one system according to the present invention. It is possible to connect together multiple cleaning systems according to the present invention in modular fashion to increase the drilling fluid handling capacity. At least one chamber of the settling tank other than inlet chamber 30a includes an outlet conduit 90 to permit connection in series to an additional drilling fluid cleaning system. Referring to FIG. 3 and FIG. 5e, which is an end section taken along line 5e—5e of FIG. 3, outlet conduit 90 preferably extends from end chamber 30c and is housed within pump enclosure 40. Outlet conduit 90 includes a valve assembly 91 to control flow of fluid through an attached hose which feeds directly into the inlet chamber of an additional adjacent drilling fluid cleaning system according to the present invention.

Drilling fluid pumped by pumps 69 and 70 is directed to centrifuges for further solids separation. Referring to FIG. 2, the illustrated embodiment employs two centrifuges 34a and 34b which are conventional units. As previously mentioned, depending on the volume of drilling fluids to be processed and the solids content of the drilling fluid, only a single centrifuge may be necessary. Centrifuges 34a and 34b are supported on a stand 120 that is movable between a stored position during transport of the cleaning system and an operating position when the system is working at a well site. Centrifuges 34a and 34b are sized to match the capacity of the pump delivering drilling fluid via conduits 72 and 73. For example, if pump 69, which pumps drilling fluid from inlet chamber 30a is rated for 1000 liters/minute, centrifuge 34a to which the fluid is delivered should be able to handle this volume. Pump 70 delivers drilling fluid from the other chambers 30b and 30c to centrifuge 34b. The cleaned drilling fluid from the centrifuges is preferably fed back into mud storage tank 12 via line 114 as best shown in FIG. 1. Alternatively, the cleaned fluid from the centrifuges can be directed back into inlet chamber 30a to reduce the solids loading on the inlet chamber.

Stand 120 that supports centrifuges 34a and 34b includes an elevatable surface 122 mounted to an elevating system for the surface between the operating position in which the surface is raised above the settling tank and the stored position in which the surface is lowered adjacent the settling tank to reduce the overall height of the unit so that the apparatus is sufficiently compact for transportation by semi-trailer on roads or highways. The elevating system for surface 122 can be constructed according to various different arrangements. Some specific preferred arrangements are described below, however, the system of the present invention is not limited to these specific arrangements.

Figure 6A:
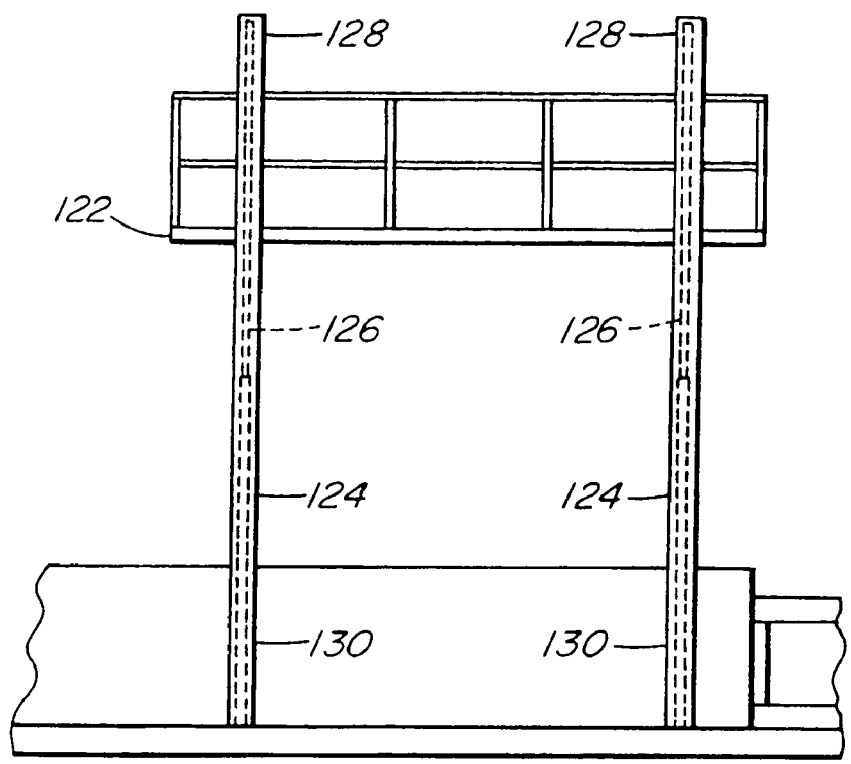
FIGS. 6a–8c are detail views of various elevatable platforms for supporting the centrifuge according to the present invention.
Figure 6B:
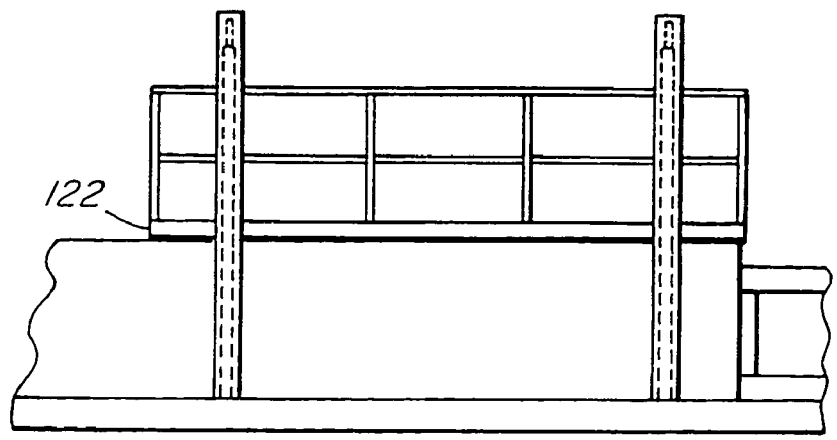

FIGS. 6a and 6b show the operation of a centrifuge stand 120 having an elevating system that relies on a plurality of telescoping legs 124. Four legs 124 extend between the side walls 45 of settling tank 30 and the corners of elevatable surface 122. Each leg includes an internal hydraulic cylinder 126 that is extendable to move an upper leg portion 128 to which surface 122 is mounted upwardly with respect to a lower fixed leg portion 130 as shown in FIG. 6a. When cylinder 126 is collapsed, surface 122 is moved downwardly to the stored position as shown in FIG. 6b.

Figure 7A:
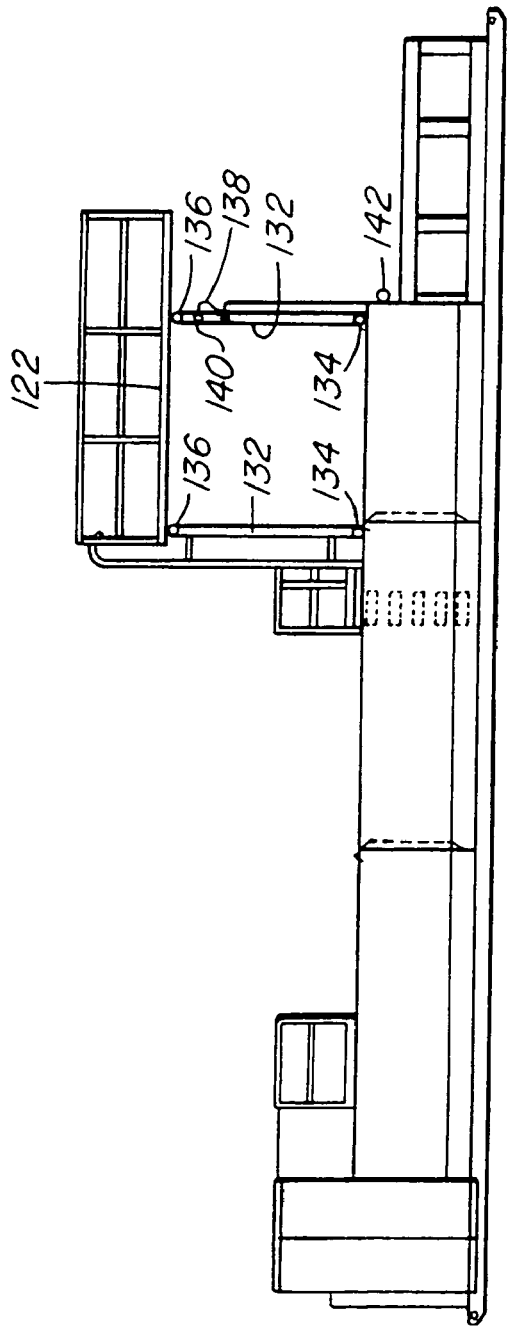
Figure 7B:
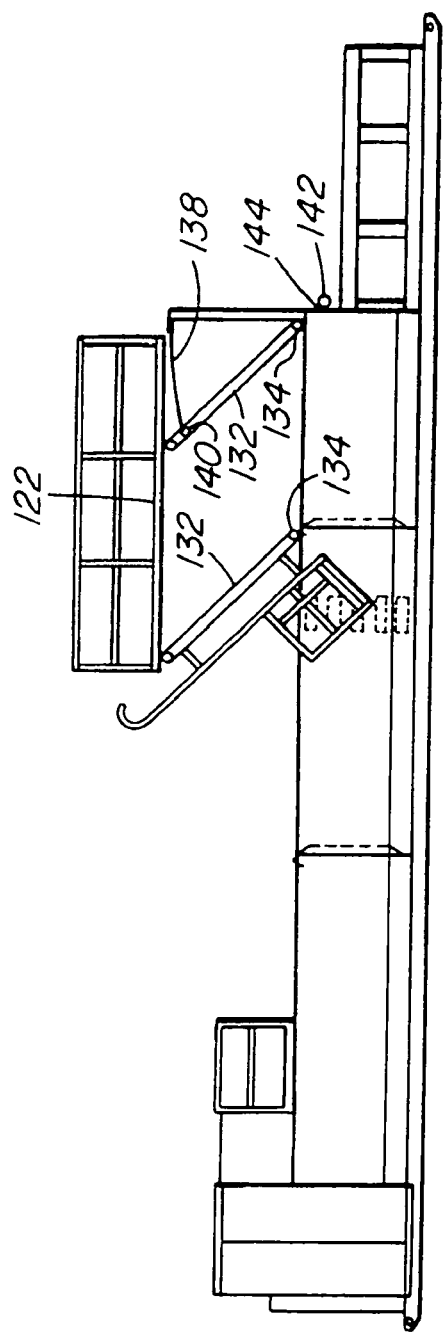
Figure 7C:
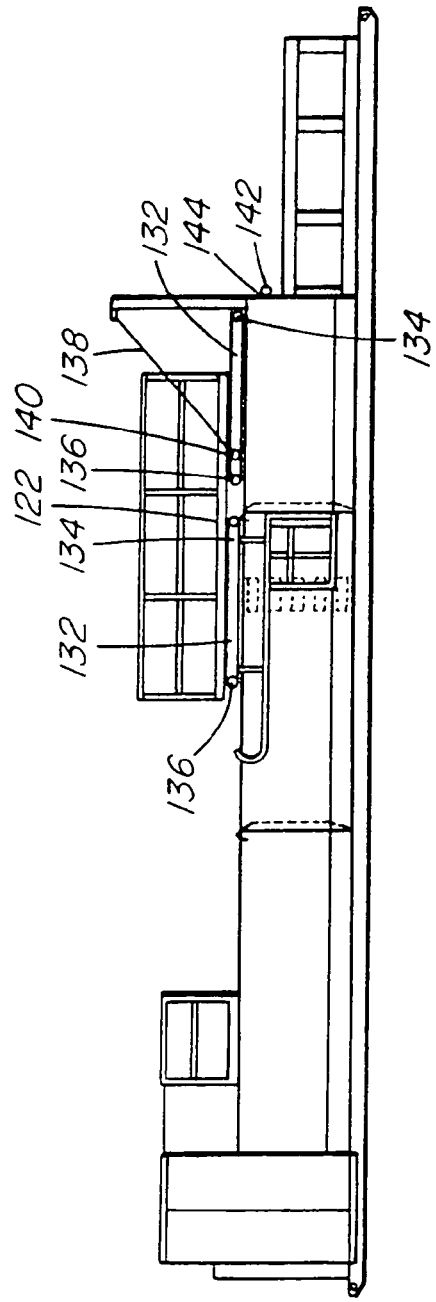

FIGS. 7a to 7c illustrate an alternative arrangement in which the elevating system comprises a plurality of pivotable legs 132 pivotable by an actuating system between a generally horizontal alignment corresponding to surface 122 being in the lowered, stored position (FIG. 7c) and a generally vertical alignment corresponding to the surface being in the raised operating position (FIG. 7a). FIG. 7b shows an intermediate position to clearly show the operation of the elevating system. Preferably, surface 122 supporting the centrifuges is supported by four pivotable legs 132 at the corners of the surface. Each pivotable leg 132 is pivotally connected to the settling tank at a lower end 134 and pivotally connected to the surface at an upper end 136. Pivoting of the legs is controlled by an actuating system comprises at least one cable 138 of variable length. A first end 140 of cable 138 is attached to at least one of the legs. Preferably, the cable is attached to two of the legs supporting surface 122. Cable 140 is extendable to allow legs 132 to pivot to their generally horizontal alignment (FIG. 7c) and retractable to pull the legs to their generally vertical alignment (FIG. 7a).

Cable 140 is attached to a piston arm of a cylinder 142 at a second end 144 of the cable, and the cable extends and retracts by virtue of extending and retracting of the piston arm. Preferably, cylinder 142 is mounted externally to the end wall 46 of settling tank 30 in a horizontal orientation. Movement of cable 140 is guided by appropriately placed sheaves along the cable path.

Figure 8A:
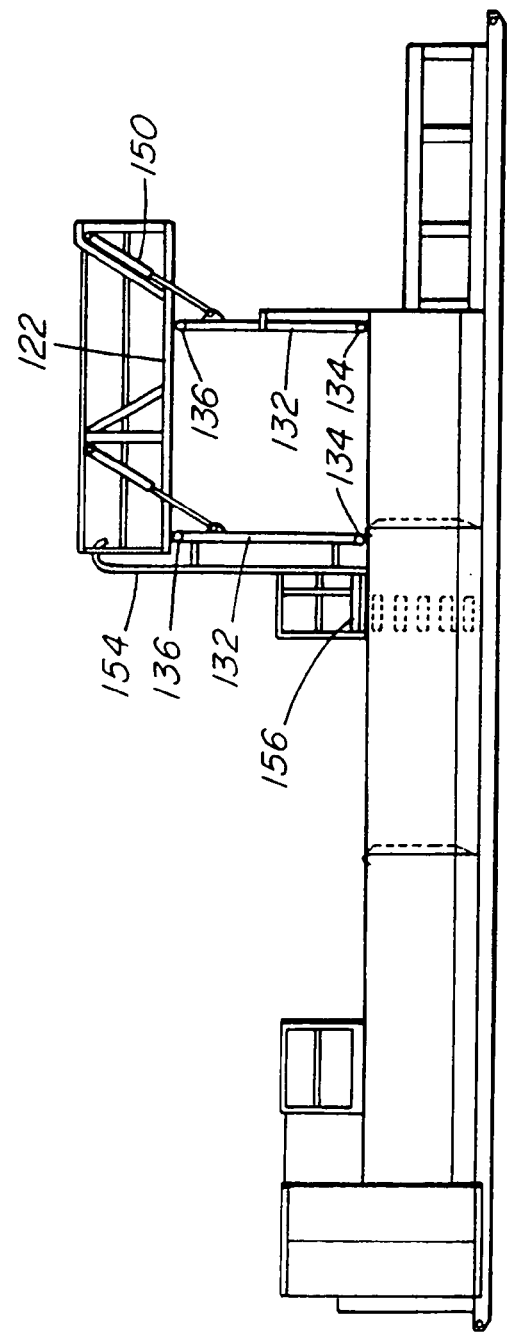

FIGS. 8a to 8c illustrate a still further elevating system that is similar to the elevating system of FIGS. 7a to 7c in that the arrangement relies on pivotable legs 132 that are pivotally connected to the settling tank at a lower end 134 and pivotally connected to surface 122 at an upper end 136. The cable actuating system is replaced by at least one telescoping cylinder 150 pivotally connected at each end of the cylinder to surface 122 and at least one of the pivotable legs 132. The telescoping cylinder is extendable and retractable to control the angle between surface 122 and the at least one pivotable leg in order to raise (FIG. 8a) and lower the surface (FIG. 8c). Preferably, there are at least two telescoping cylinders 150 associated with two pivotable legs.

As shown in FIG. 8a, it is preferably that an access ladder 154 and walkway 156 are mounted to at least one of the pivotable legs 132 to permit access to the centrifuge stand when it is in the raised, operating position. Ladder 154 and walkway 156 are mounted to legs 132 such that the ladder and walkway are positioned within the settling tank when the legs are pivoted to the generally horizontal alignment shown in FIG. 8c.

In certain circumstances during drilling, it may be desirable to use a flocculating agent to promote the removal of solids from the drilling fluid. To address this need, the system of the present invention may include a flocculent source for adding a flocculating agent to the drilling fluid. Preferably, the flocculent source comprises at least one compartment 36 for holding and mixing a flocculating agent and a delivery system to deliver flocculating agent to the centrifuges and/or the settling tank. Preferably, flocculating agent is added to the drilling fluid at the inlets of pumps 69 and 70 so the agent is mixed with the drilling fluid prior to centrifuging. Alternatively, flocculating agent can be added to one or more chambers of the settling tank.

As best shown in FIGS. 2 and 3, the flocculent source preferably comprises two compartments 36a, 36b for holding and mixing flocculating agent. In the illustrated example, compartments 36a, 36b both deliver flocculating agent to the inlet of pumps 69,70. Alternatively, first compartment 36a may deliver flocculating agent to the inlets of pumps 69 and 70 while second compartment 36b may deliver flocculating agent to the inlet chamber of the settling tank. Compartments 36a, 36b are preferably positioned above the settling tank over end chamber 30c. However, compartments 36a, 36b may alternatively be located or positioned at either end of the settling tank 30 or at any other suitable location within the apparatus 6.

Figure 5F:
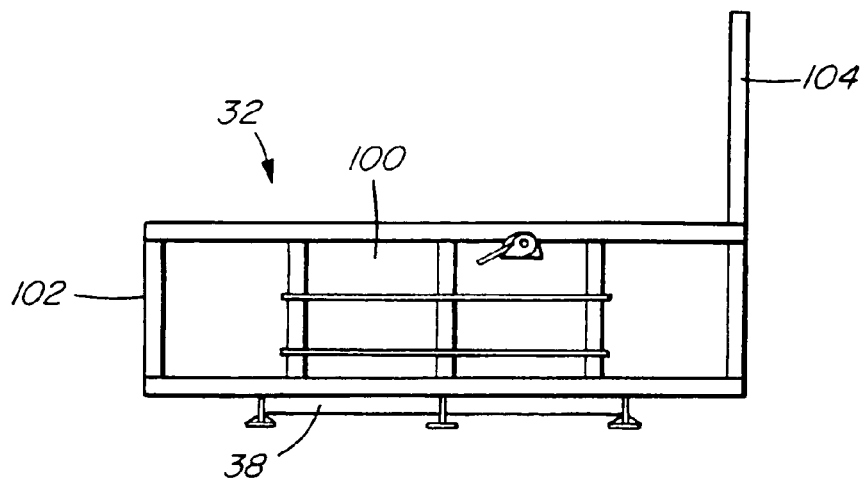
Figure 5G:
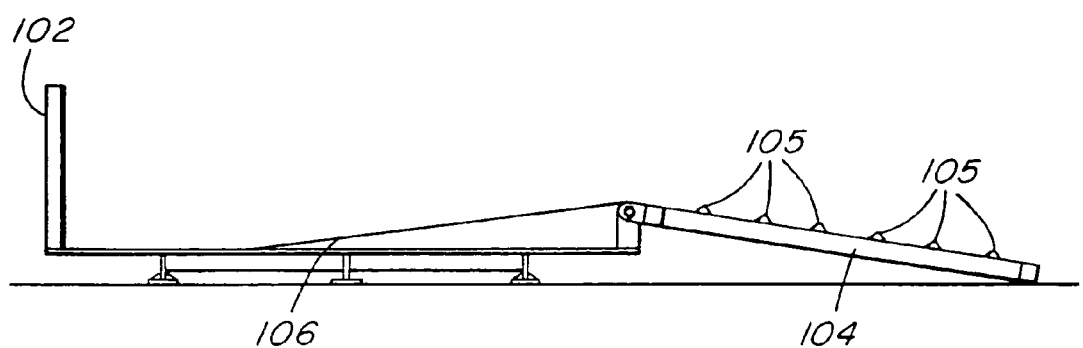

Solids removed from the drilling fluid by centrifuges 34a and 34b and solids from shale shaker 20 are preferably stored in a bin 32 adjacent the same end of skid 38 as the centrifuges. Collection pipes 68a and 68b within the settling tanks tend to collect all the settled solids from chambers 30a, 30b and 30c for delivery to pumps 69, 70 and the centrifuges. Bin 32 is defined by four walls and a floor at a region of the skid adjacent inlet chamber 30a and centrifuges 34a,34b. FIG. 5f is an end view of skid 38 taken along line 5f—5f of FIG. 3 showing an end wall 100 of bin 32. The opposite end wall of the bin is wall 46 shared with inlet chamber 30a. Side wall 102 of bin 32 is fixed while the opposite side wall 104 is pivotally mounted to move between a first raised position to retain solids dumped into the bin (FIG. 5f) and a second, lowered position to define a ramp for access to the bin for periodic removal of solids (FIG. 5g). When wall 104 is in its lowered position as a ramp, a front end loader or other suitable equipment can be driven up the ramp to permit efficient access to the bin interior. Preferably, wall 104 is formed with transverse ridges 105 that act as traction bars for vehicles entering the bin when in the lowered position. Preferably, the floor 106 of bin 32 is sloped away from pivotally mounted wall 104 to ensure that solids tend to collect away from the pivoting connection of wall 104.

In use, the drilling fluid cleaning system of the present invention is operated according to different schemes depending on the drilling stage.

During drilling of the "surface hole" (the first portion of the borehole), relatively high viscosity drilling fluid is used to protect groundwater aquifers. During drilling of the surface hole, only the shale bin of the system is typically used. This involves sending solids retained on the shale shaker to the shale bin as indicated by arrow 110 on FIG. 1.

During drilling of the "floc-water section" (the middle portion of the borehole), relatively low viscosity drilling fluid is used in order to maximize the rate of penetration. During drilling of the floc-water section, all of the components of the system are typically used. This involves sending solids from the shale shaker to the shale bin 32, and also circulating drilling fluid from mud storage tank 12 to settling tank 30, and centrifuges 34, and then back to the mud storage tank. Solids from the centrifuges 34 are also sent to the shale bin as indicated by arrow 112 in FIG. 1.

During drilling of the "mud-main hole" (the bottom portion of the borehole), the producing formation is penetrated and the viscosity and weight of the drilling fluid must be carefully monitored. During the drilling of the main hole, only the centrifuges 34 and the shale bin 32 of the system are typically used. This involves sending drilling fluid from mud storage tank 12 directly to the centrifuges 34 for treatment using bypass conduits 80, and then returning the treated drilling fluid to the mud storage tank as shown by arrow 114 in FIG. 1. Solids collected on the shale shaker and solids from the centrifuges are sent to shale bin 32.

While the apparatus of the present invention has been described in an environment in a well drilling environment, it is contemplated that the apparatus can be used in any situation where there is a requirement for high volume removal of solids from a fluid/solid mixture in order to recycle the fluid portion.

As indicated above, referring to FIG. 1, the transportable drilling fluid cleaning system 6 includes the settling tank 30, as previously described. However, where desired, an alternate or improved settling tank 160, as shown in FIGS. 9–17, may be utilized. As stated, the settling tank 160 may comprise a portion or component of the transportable drilling fluid cleaning system 6. Alternately, the settling tank 160 may be used in combination with other compatible systems or components, or it may be used independently or apart from any such further systems or components.

Referring to FIG. 9, where used as a component of the transportable drilling fluid cleaning system 6, the settling tank 160 will simply replace previous settling tank 30. The settling tank 160 will be mounted on skid 38 with the other components of the system 6 and will be used in the previously described manner except where otherwise noted herein.

Further, the settling tank 160 is for use in separating a solids containing fluid 162. Preferably, the solids containing fluid 162 is comprised of the drilling fluid 14 or the fluid/solid mixture as described above. The solids containing fluid 162 is capable of separating or settling into an upper separated fraction 164 and a lower separated fraction 166. As the solids or solid material within the solids containing fluid 162 will tend to settle within the settling tank 160, the upper separated fraction 164, which may also be referred to as the upper fluid fraction described above, has a reduced concentration or proportion of solids or solid material than the lower separated fraction 166, which may also be referred to as the lower solids fraction described above.

Referring to FIGS. 9–17, the settling tank 160 is comprised of at least one settling compartment 168. However, preferably, the settling tank 160 is comprised of a first settling compartment 168a and at least one subsequent settling compartment 168b. More particularly, a plurality of substantially similar settling compartments 168 are preferably connected together in series such that the solids containing fluid 162 passes through each settling compartment 168 in turn, during which the proportion or percentage of solids therein is reduced. In the preferred embodiment, as shown in FIG. 9, the settling tank 160 is comprised of the nine substantially similar settling compartments 168, particularly the first settling compartment 168a and eight subsequent settling compartments 168b through 168i connected in series and which may also be referred to herein as the second to ninth settling compartments respectively.

As each settling compartment 168 is preferably similar to the others, within each settling compartment 168, the solids containing fluid 162 entering therein is separated into the upper separated fraction 164 and the lower separated fraction 166. As will be described further below, the upper separated fraction 164 is directed out of the settling compartment and into the next subsequent settling compartment in series. Thus, the upper separated fraction 164 from the previous settling compartment 168 comprises the solids containing fluid 162 entering the subsequent settling compartment 168. As a result, the proportion of solids in the solids containing fluid 162 is reduced as the fluid 162 passes through each settling compartment 168.

The plurality of settling compartments 168 may be configured or arranged in series in any manner. However, preferably, the settling compartments 168 are arranged or disposed in a manner permitting their transportation on the skid 38 as a component of the drilling fluid cleaning system 6. In the preferred embodiment, each of the settling compartments 168 includes a lower end or bottom 170 of the settling compartment 168, two opposed ends 172 and two opposed sides 174 which together comprise the sidewall of the settling compartment 168. Preferably, the settling compartments 168 are arranged end to end 172 in a column 176 and a plurality of columns 176 are arranged side to side 174. In the preferred embodiment, as shown in FIG. 9, the settling tank 160 includes nine settling compartments 168 arranged so that three settling compartments 168 are disposed in each of three columns 176.

Further, each settling compartment 168 further includes an inlet 178 and an upper outlet 180 so that the solids containing fluid 162 enters the settling compartment 168 via the inlet 178 and passes through the settling compartment 168 generally in a first direction, indicated by arrow 182, from the inlet 178 toward the upper outlet 180. The inlet 178 and the upper outlet 180 may be positioned at any location within each settling compartment 168 permitting the solids containing fluid 162 to pass through the settling compartment 168 generally or substantially in the first direction 182.

In the preferred embodiment, the inlet 178 of the first settling compartment 168a is comprised of a pipe or conduit directing a flow of the solids containing fluid 162 therein. As shown in FIG. 1, this conduit may be comprised of conduit 18a. The inlet 178 of each subsequent settling compartment 168b–i and the upper outlet 180 of the immediately preceding settling compartment 168a–h are preferably provided by a single structure or common component.

Figure 16:
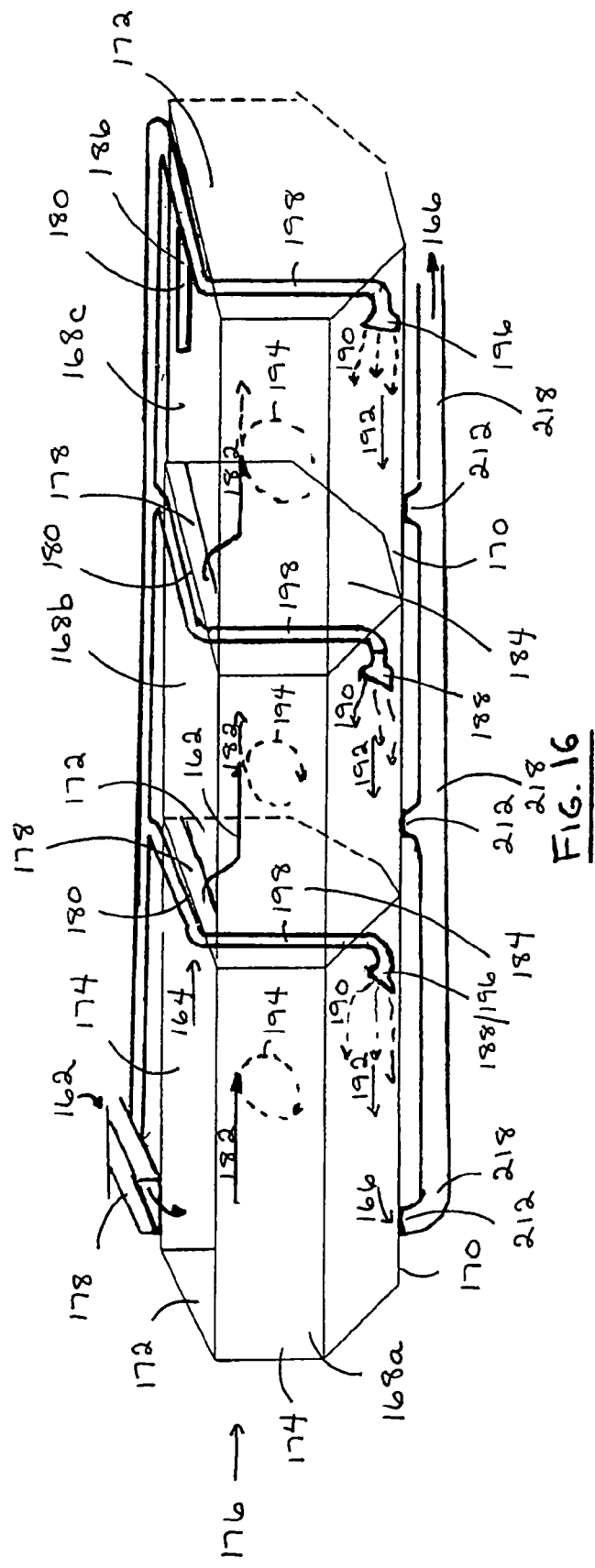
FIG. 16 is a schematic elevation view of a series of three settling compartments of the settling tank depicted in FIG. 9 in operation.
Figure 17:
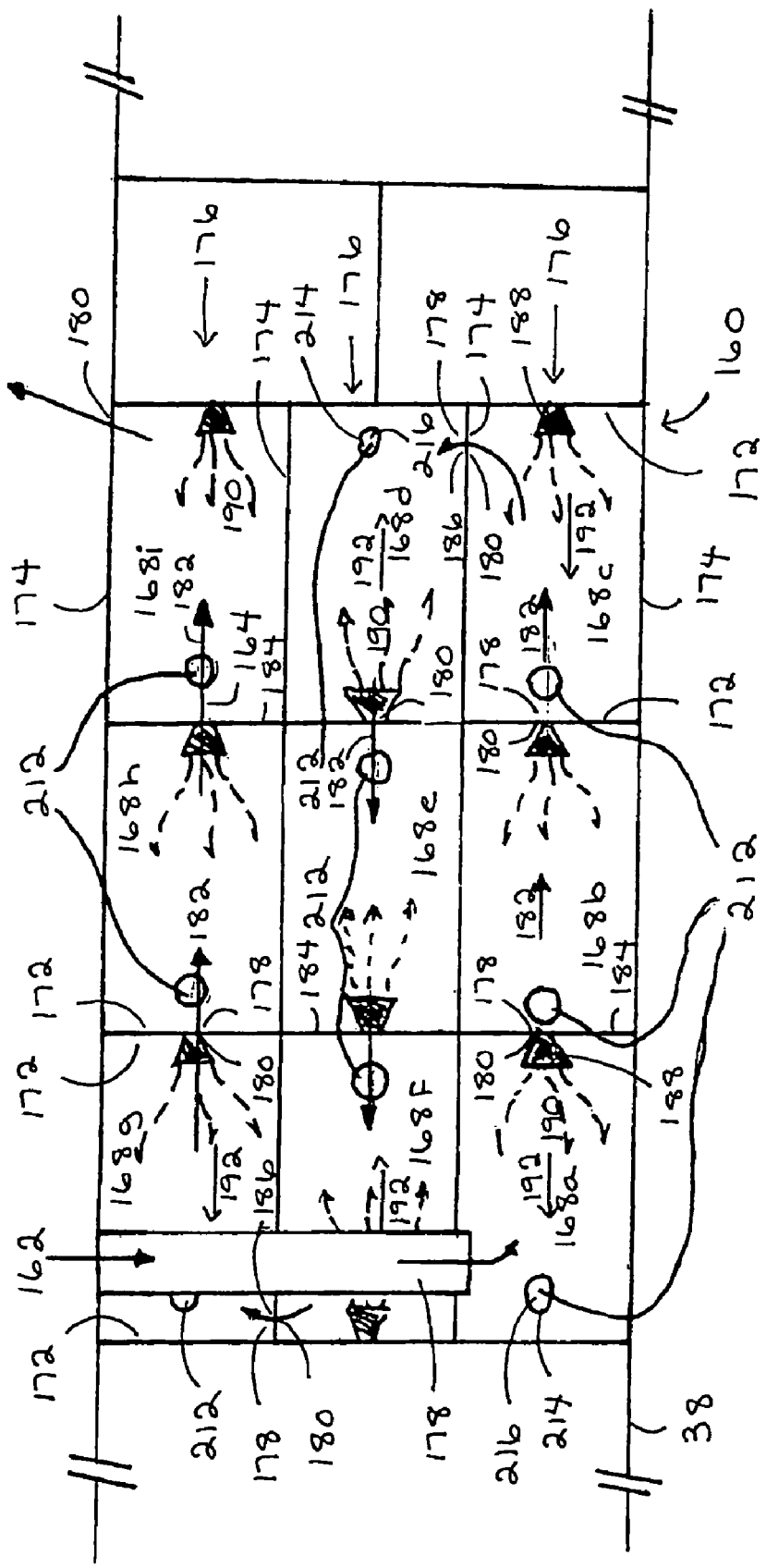
FIG. 17 is a schematic plan view of the settling tank depicted in FIG. 9 in operation.

Referring to FIGS. 9, 16 and 17, the upper outlet 180 of the first settling compartment 168a and the inlet 178 of the second settling compartment 168b are comprised of a weir or baffle 184. Specifically, the weir 184 provides the adjacent ends 172 of the first and second settling compartments 168a, 168b and thus separates the first and second settling compartments 168a, 168b. The upper separated fraction 164 within the first settling compartment 168a thus passes over the weir 184 to comprise the solids containing fluid 162 entering the second settling compartment 168b. In the preferred embodiment, a weir 184 or like structure is also provided between adjacent ends 172 of: the first and second settling compartments 168a, 168b; the second and third settling compartments 168b, 168c; the fourth and fifth settling compartments 168d, 168e; the fifth and sixth settling compartments 168e, 168f; the seventh and eighth settling compartments 168g, 168h; and the eighth and ninth settling compartments 168h, 168i.

Given the arrangement of the settling compartments 168 in columns 176, the upper outlet 180 of the third settling compartment 168c and the inlet 178 of the fourth settling compartment 168d are comprised of a slit, orifice or other passage 186. Specifically, the slit or orifice 186 is defined in the adjacent sides 174 of the third and fourth settling compartments 168c, 168d. The upper separated fraction 164 within the third settling compartment 168c thus passes through the orifice 186 to comprise the solids containing fluid 162 entering the fourth settling compartment 168d. In the preferred embodiment, an orifice 186 or like structure is also provided between adjacent sides 174 of the sixth and seventh settling compartments 168f, 168g and comprises the upper outlet 180 of the ninth settling compartment 168i.

Each settling compartment 168 is further comprised of a backwash fluid source 188 for directing a backwash fluid 190 within each settling compartment 168 generally in a second direction, indicated by arrow 192, which is substantially opposite to the first direction 182. The backwash fluid source 188 may be positioned at any location within each settling compartment 168 permitting the backwash fluid source 188 to direct the backwash fluid 190 in the second direction 192 generally or substantially opposite to the first direction 182. In the preferred embodiment, the first direction 182 in each settling compartment 168 is a substantially horizontal direction. Similarly, the second direction 192 in each settling compartment 168 is a substantially horizontal direction.

It is believed that the opposite directions 182, 192 of flow of the solids containing fluid 162 and the backwash fluid 190 provides or causes a rolling action or rolling fluid flow, indicated by arrow 194 in FIG. 16, in the settling compartment 168. The opposite directions 182, 192 of flow of the solids containing fluid 162 and the backwash fluid 190 may also increase the residence time of the solids containing fluid 162 within the settling compartment 168, which may enhance the settling of the solids therein.

In order to enhance or facilitate this rolling action 194, and to reduce any disturbance of the lower separated fraction 166 in the settling compartment 168, the backwash fluid 190 is provided under substantially laminar flow conditions. More particularly, the solids containing fluid 162 has a fluid flowrate and the backwash fluid 190 has a backwash fluid flowrate. Preferably, the backwash fluid flowrate is substantially less than the fluid flowrate. More particularly, the backwash fluid flowrate is preferably less than about fifty percent of the fluid flowrate, and more preferably, the backwash fluid flowrate is less than about twenty percent of the fluid flowrate. In the preferred embodiment, the backwash fluid flowrate is about ten percent of the fluid flowrate.

Figure 10:
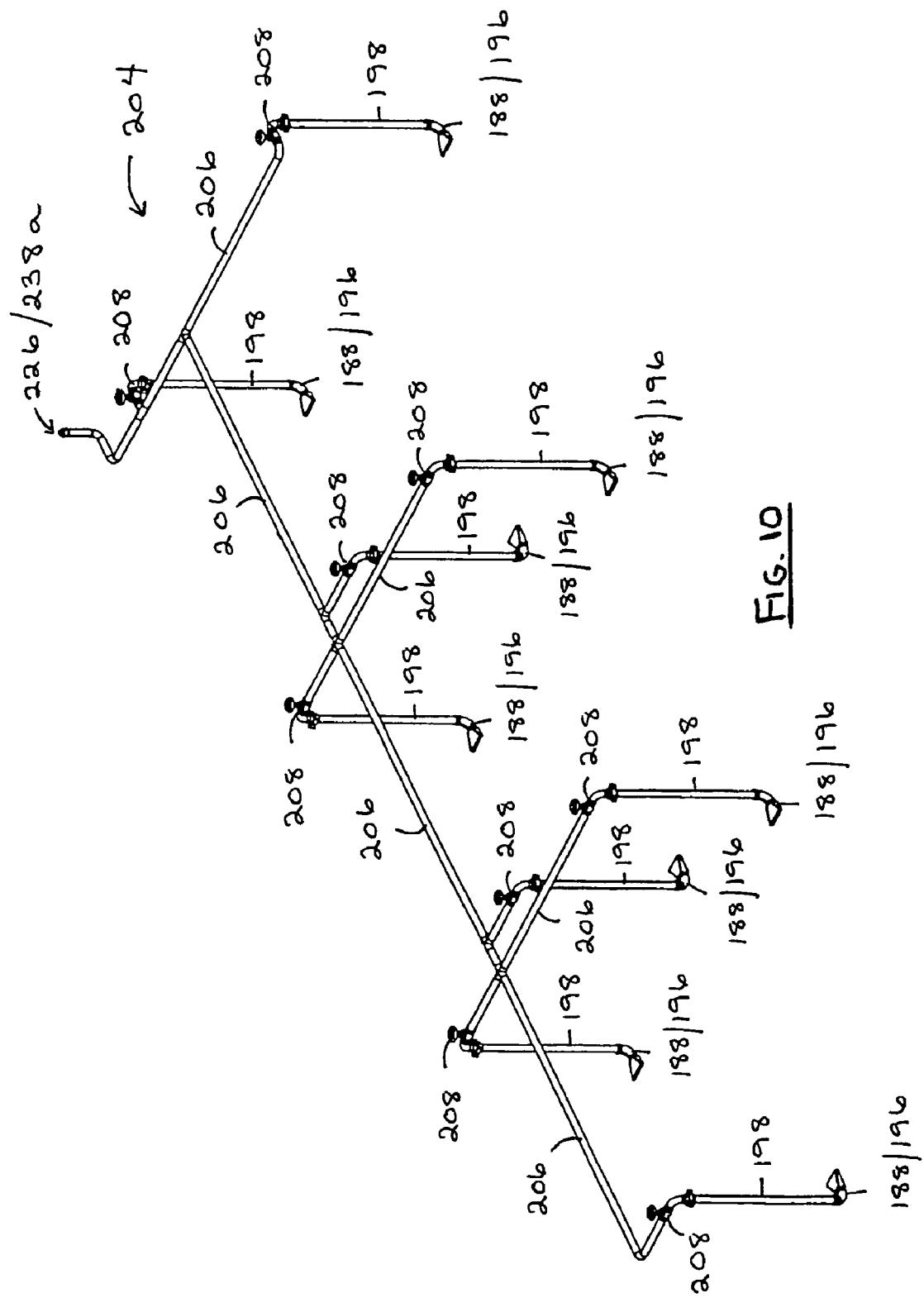
FIG. 10 is a pictorial view of a backwash fluid pipe assembly for use in the settling tank depicted in FIG. 9.
Figure 15:
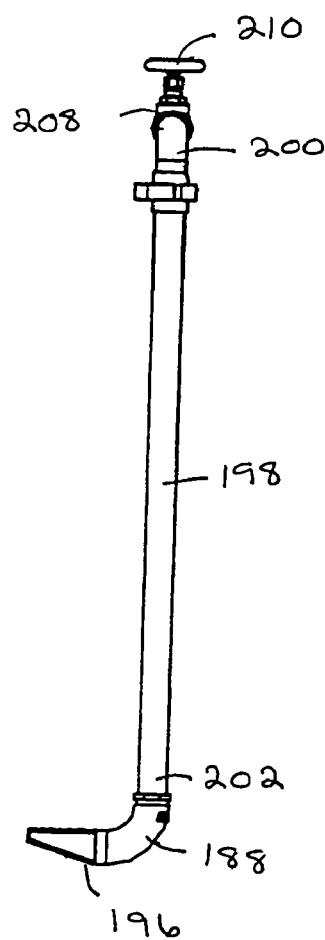
FIG. 15 is a pictorial view of a backwash fluid pipe for use in the settling tank depicted in FIG. 9.

Referring to FIGS. 10 and 15, in the preferred embodiment, the backwash fluid source 188 in each settling compartment 168 is comprised of a nozzle 196 or jet adapted or oriented such that the backwash fluid 190 is directed in the second direction, preferably substantially horizontally. Any conventional nozzle or jet may be utilized which is suitable for performing the function of the nozzle 196 as described herein. The nozzle 196 may be positioned in the settling compartment 168 at any location permitting the desired direction of the backwash fluid 190 therefrom. However, preferably, the nozzle 196 is positioned adjacent to the lower end 170 or bottom of the settling compartment 168 or in relatively close proximity to the lower end 170. The proximity to the lower end 170 permits the proper functioning of the backwash fluid source 188 as discussed herein. Preferably the nozzle 196 is positioned less than about three inches from or above the lower end 170 of the settling compartment 168. In the preferred embodiment, the nozzle 196 is positioned about 1½ inches from or above the lower end 170 of the settling compartment 168. Further, the nozzle 196 is preferably positioned adjacent the end 172 of the settling compartment 168 opposite to, or farthest from, the inlet 178 to facilitate the effect of the backwash fluid 190.

Further, as shown in FIGS. 10 and 15–17, a backwash fluid pipe 198 is provided for communicating with each nozzle 196 so that the backwash fluid pipe 198 supplies the backwash fluid 190 thereto. More particularly, a backwash fluid pipe 198 extends within each of the settling compartments 168 from an upper end 200 positioned above the settling compartment 168 to a lower end 202 for connection with the nozzle 196.

In the preferred embodiment in which the settling tank 160 is comprised of a plurality of settling compartments 168, a backwash fluid pipe assembly 204 is provided, as shown in FIG. 10, which communicates with each of the nozzles 196 for supplying the backwash fluid 190. Thus, the backwash fluid pipe assembly 204 is comprised of the plurality of backwash fluid pipes 198, as well as a plurality of interconnecting conduits or pipes 206 which permit fluid communication between the backwash fluid pipes 198. In particular, the interconnecting pipes 206 communicate with the upper end 200 of each backwash fluid pipes 198, as well as with the supply of the backwash fluid 190, as discussed below.

To provide flexibility with respect to the use and operation of the settling tank 160, it is desirable that each of the settling compartments 168 be capable of independent actuation or functioning. As a result, the backwash fluid source 188 of each settling compartment 168 is preferably provided with an actuatable backwash fluid source valve 208 so that the backwash fluid source 188 may be selectively opened and closed. Thus, each nozzle 196 may be selectively opened or closed to permit the flow of backwash fluid 190 therethrough. Further, each of the backwash fluid source valves 188 is also configured so that each of the backwash fluid sources 188 may be independently opened and closed. Thus, each nozzle 196 may be independently or individually opened or closed in any desired combination.

The backwash fluid source valve 188 may be operatively associated with the nozzle 196 in any manner permitting the-proper functioning of the valve 188 and control of the flow of backwash fluid 190. However, as shown in FIGS. 10 and 15–17, each backwash fluid source valve 188 is preferably operatively connected into the backwash fluid pipe assembly 204 at the upper end 200 of its respective backwash fluid pipe 198. Thus, the backwash fluid source valve 188 may be actuated to an opened position to permit flow through the backwash fluid pipe 198 to the "opened" nozzle 196 or it may be actuated to a closed position to prevent flow through the backwash fluid pipe 198 to the "closed" nozzle 196.

The backwash fluid source valve 188 may be comprised of any suitable valving structure compatible with its intended function. Further, the backwash fluid source valve 188 may be actuated between the opened and closed positions in any suitable manner, such as by a manually actuated handle or lever 210. Preferably, the handle or lever 210 is mounted for ease of access by the operator of the settling tank 160. Thus, as shown in FIG. 10, the handle or lever 210 is preferably located above the settling compartments 168.

Referring to FIGS. 16 and 17, each settling compartment 168 is also further comprised of a lower outlet 212 located at or adjacent to the lower end 170 of the settling compartment 168. The lower outlet 212 is provided for the withdrawal of the lower separated fraction 166 from the settling compartment 168. In the preferred embodiment, the lower outlet 212 is comprised of a drain 214 or like structure in the lower end 170 of the settling compartment 168 and an associated collection area or sump 216. Thus, the lower separated fraction 166 tends to settle at the lower end 170 of the settling compartment 168, where it may be withdrawn through the lower outlet 212 by passing through the drain 214 for collection in the sump 216. The lower separated fraction 166 may then be selectively withdrawn from the sump 216 in the manner described further below.

Further, the lower outlet 212 is preferably positioned in the lower end 170 of the settling compartment 168 at a location at which the lower separated fraction 166 is more likely to collect or settle. In the preferred embodiment, with the possible exception of the first settling compartment 168a, the lower outlet 212 is located in each settling compartment 168 between the inlet 178 and the nozzle 196 so that the nozzle 196 directs the backwash fluid 190 generally toward the lower outlet 212. More particularly, the lower outlet 212 is preferably positioned adjacent the end 172 of the settling compartment 168 opposite the nozzle 196. Regarding the first settling compartment 168a, the lower outlet 212 is also preferably positioned adjacent the end 172 of the settling compartment 168 opposite the nozzle 196, although this position may not necessary be between the inlet 178 and the nozzle 196 given the preferred configuration of the inlet 178 in this first settling compartment 168a. As a result of this positioning in each settling compartment 168, the backwash fluid 190 acts to push or facilitate the movement of the lower separated fraction 166 towards the lower outlet 212.

To further facilitate the collecting or settling of the lower separated fraction 166 and to further facilitate the movement of the lower separated fraction 166 towards the lower outlet 212, the sidewall 174 comprised of the opposed sides 174 of each settling compartment 168 is preferably sloped so that the settling compartment 168 narrows toward the lower end 170 thereof.

Further, as shown in FIGS. 11, 13, 14 and 16, a solids removal pipe 218 is provided for communicating with each lower outlet 212 for withdrawing the lower separated fraction 166 from the settling compartment 168. More particularly, a solids removal pipe 218 preferably extends within the sump 216 of the lower outlet 212 of each settling compartment 168.

Figure 11:
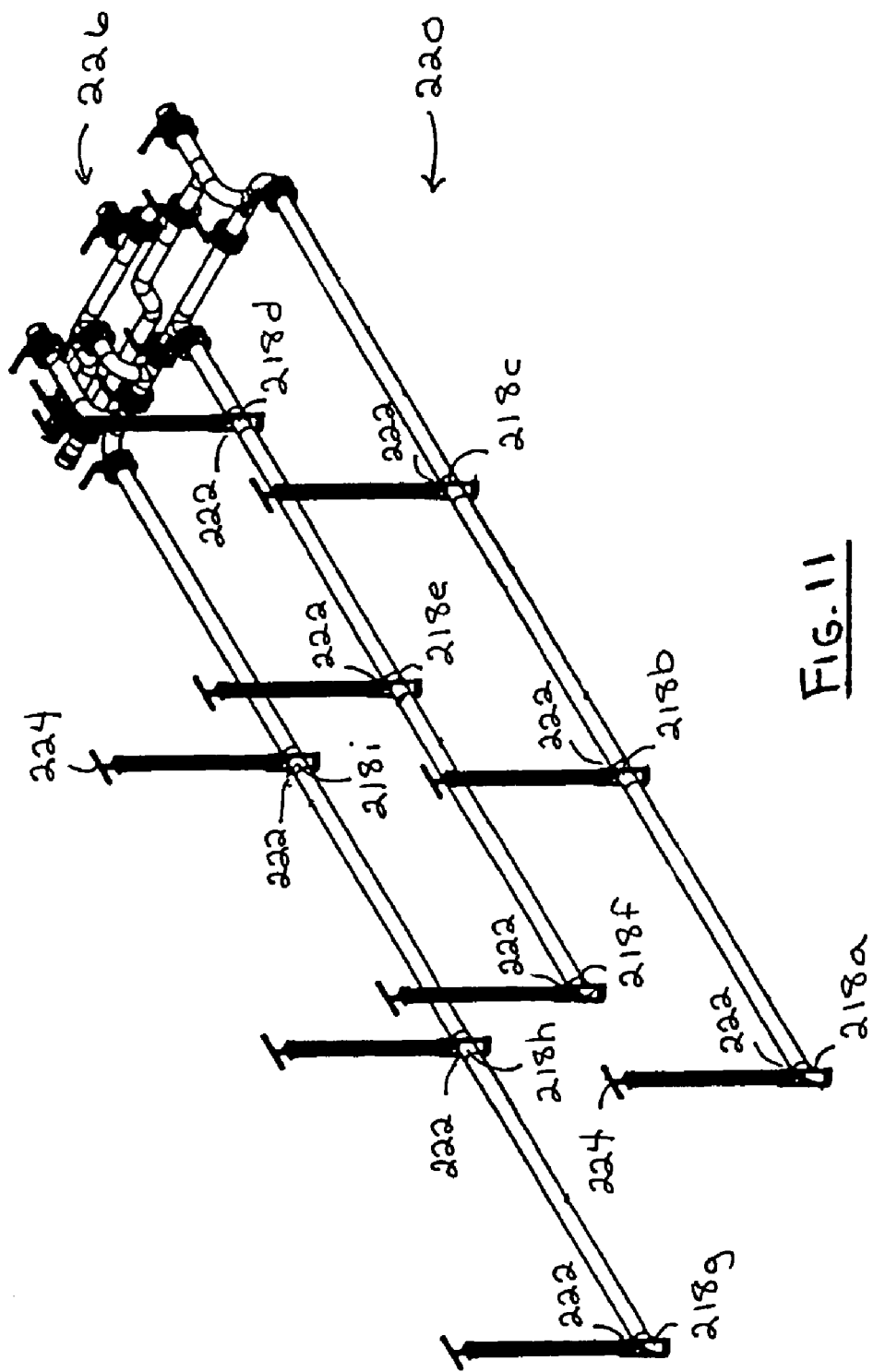
FIG. 11 is a pictorial view of a solids removal pipe assembly for use in the settling tank depicted in FIG. 9.

In the preferred embodiment in which the settling tank 160 is comprised of a plurality of settling compartments 168, a solids removal pipe assembly 220 is provided, as shown in FIGS. 11 and 16, which communicates with each of the lower outlets 212 for withdrawing or removing the lower separated fraction 166. Thus, the solids removal pipe assembly 220 is comprised of the plurality of solids removal pipes 218 which are preferably interconnected to permit communication therebetween as shown in FIG. 11. Further, the solids removal pipe assembly 220 preferably extends from the lower outlets 212 underneath or below the settling compartments 168 for connection with a further solids transport or removal system, as discussed further below.

Figure 13:
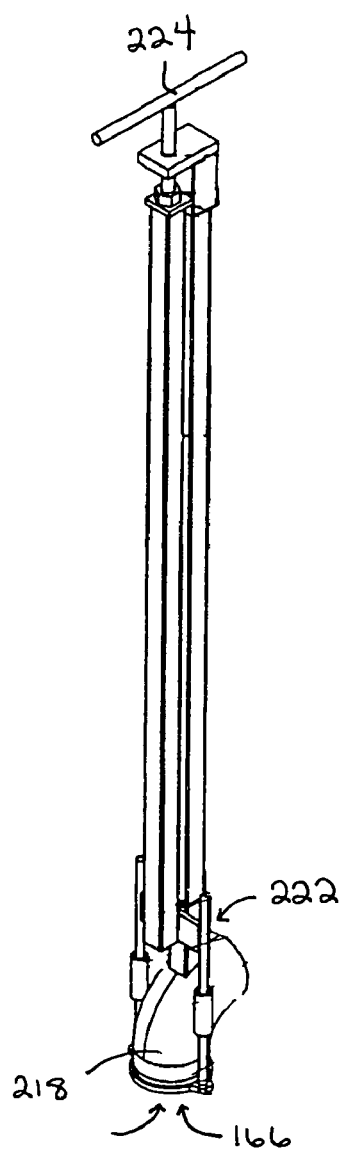
FIG. 13 is a pictorial view of a terminal solids removal pipe for use in the settling tank depicted in FIG. 9.
Figure 14:
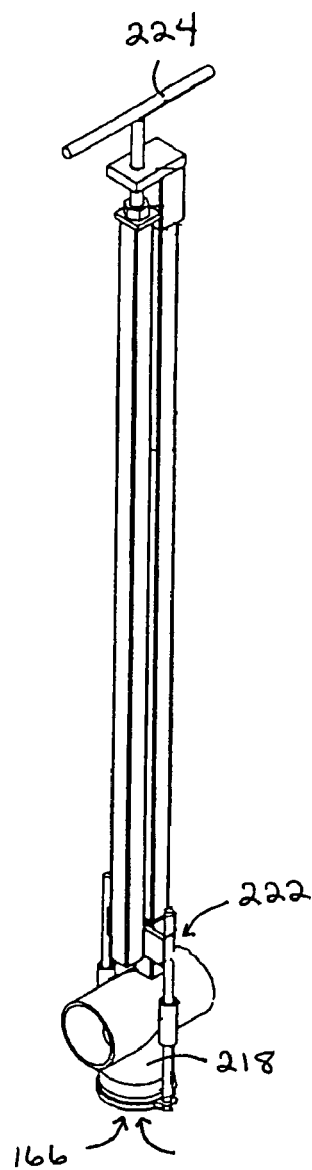
FIG. 14 is a pictorial view of an intermediate solids removal pipe for use in the settling tank depicted in FIG. 9.

Depending upon the location of each solids removal pipe 218 in the solids removal pipe assembly 220, the configuration of the solids removal pipe 218 may vary to permit its connection into the solids removal pipe assembly 220. For instance, FIG. 11 shows nine solids removal pipes 218a–i to be provided for the nine settling compartments 168a–i. FIG. 13 depicts a solids removal pipe 218 which would be provided at an end of the solids removal pipe assembly 220 where fluid flow therethrough is not required. Thus, FIG. 13 depicts solids removal pipes 218a, 218f and 218g for the first, sixth and seventh settling compartments 168a, 168f and 168g respectively. FIG. 14 depicts a solids removal pipe 218 which would be provided at an intermediate location of the solids removal pipe assembly 220 where fluid flow therethrough is required. Thus, FIG. 14 depicts solids removal pipes 218b, 218c, 218d, 218e, 218h and 218i for the second, third, fourth, fifth, eighth and ninth settling compartments 168b, 168c, 168d, 168e, 168h and 168i respectively.

As indicated, to provide flexibility with respect to the use and operation of the settling tank 160, it is desirable that each of the settling compartments 168 be capable of independent actuation or functioning. As a result, the lower outlet 212 of each settling compartment 168 is preferably provided with an actuatable lower outlet valve 222 so that the lower outlet 212 may be selectively opened and closed. Thus, each lower outlet 212 may be selectively opened or closed to permit the withdrawal of the lower separated fraction 166 therethrough. Further, each of the lower outlet valves 222 is also configured so that each of the lower outlets 212 may be independently opened and closed. Thus, each lower outlet 212 may be independently or individually opened or closed in any desired combination.

The lower outlet valve 222 may be operatively associated with the lower outlet 212 in any manner permitting the proper functioning of the valve 222 and control of the withdrawal of the lower separated fraction 166 from the sump 216. Preferably, the lower outlet valve 222 is operatively associated with the solids removal pipe 218. Thus, the valve 222 may be actuated to an opened position to "open" the lower outlet 212 and permit flow through the solids removal pipe 218 into the solids removal pipe assembly 220 or the valve 222 may be actuated to a closed position to "close" the lower outlet 212 and prevent flow through the solids removal pipe 218 into the solids removal pipe assembly 220. When the lower outlet 212 for a particular settling compartment 168 is closed, fluid flow through the solids removal pipe assembly 220 simply bypasses that settling compartment 168.

The lower outlet valve 222 may be comprised of any suitable valving structure compatible with its intended function. Further, the lower outlet valve 222 may be actuated between the opened and closed positions in any suitable manner, such as by a manually actuated handle or lever 224. Preferably, the handle or lever 224 is mounted for ease of access by the operator of the settling tank 160. Thus, as shown in FIG. 11, the handle or lever 224 preferably extends above the settling compartments 168.

Figure 12:
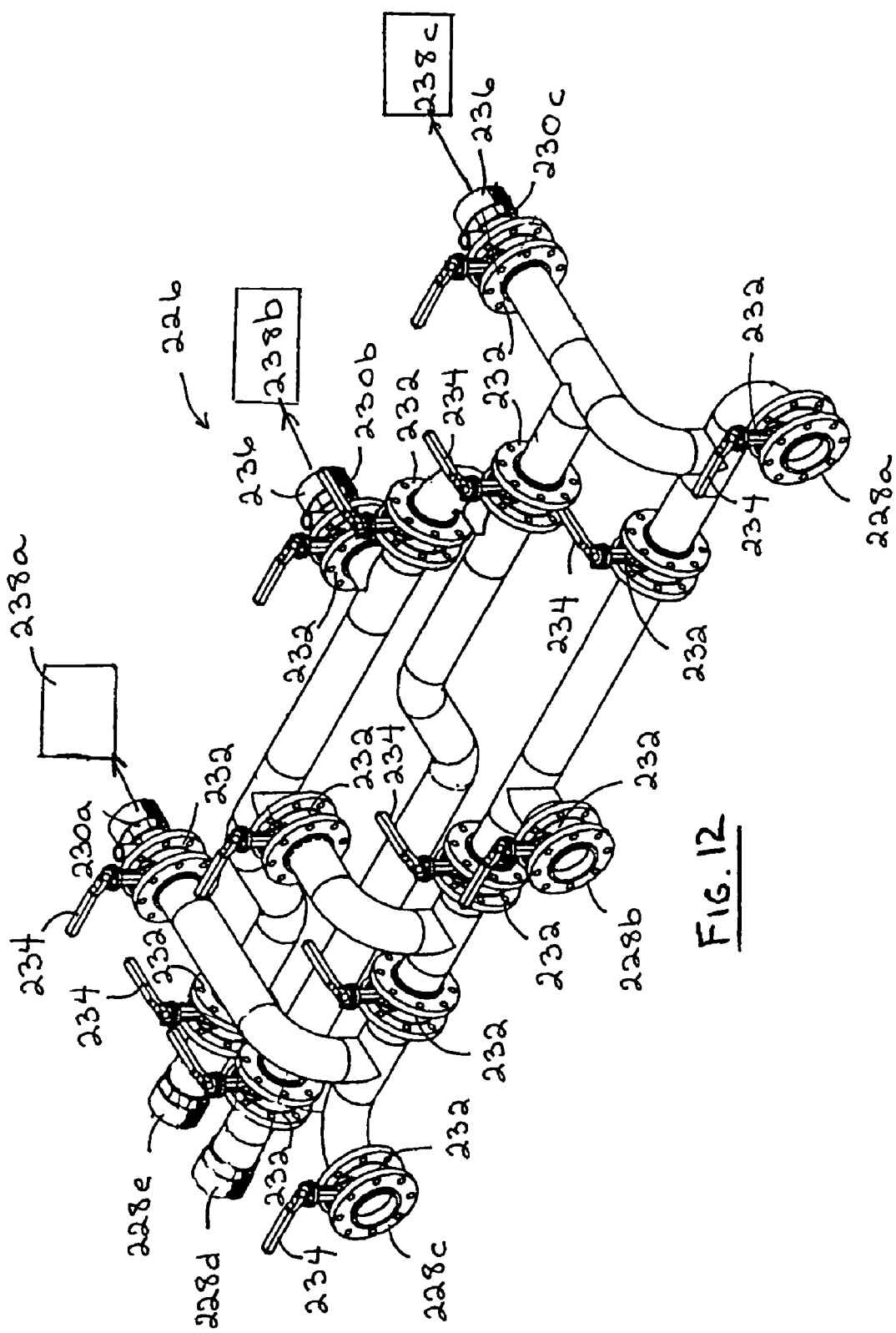
FIG. 12 is a pictorial view of a pipe manifold for use in the settling tank depicted in FIG. 9.

In addition, referring to FIGS. 11 and 12, the settling tank 160 preferably provides a pipe manifold 226 connected with both the solids removal pipe assembly 220 and the backwash fluid pipe assembly 204. The pipe manifold 226 permits control over the flow of the lower separated fraction 166 and the backwash fluid 190 through the respective assemblies 220, 204. The pipe manifold 226 may be directly or indirectly connected with each of the solids removal pipe assembly 220 and the backwash fluid pipe assembly 204 in any suitable manner. As a result, the pipe manifold 226 is comprised of a plurality of manifold inlets 228 and manifold outlets 230.

In the preferred embodiment, the solids removal pipe assembly 220 is connected directly or indirectly with at least one manifold inlet 228, and preferably with three manifold inlets 228a, 228b and 228c. Manifold inlets 228d and 228e are preferably provided as auxiliary or supplementary inlets in the event further fluids are required or desired to be introduced therein. Further, the backwash fluid pipe assembly 204 is connected directly or indirectly with at least one manifold outlet 230, and preferably with a single manifold outlet 230a.

Further, the backwash fluid 190 is preferably comprised of all or a portion of the lower separated fraction 166 withdrawn from the lower outlet 212 of one or more settling compartments 168. In other words, at least a portion of the lower separated fraction 166 withdrawn from the lower outlet 212 of at least one settling compartment 168 is recycled or returned to the backwash fluid source 188 as the backwash fluid 190. Thus, the pipe manifold 226 also preferably supplies or directs the lower separated fraction 166 from one or more lower outlets 212 to one or more backwash fluid sources 188 as the backwash fluid 190.

Preferably, the backwash fluid 190 provided to a particular settling compartment 168 is comprised of at least a portion of the lower separated fraction 166 withdrawn from the lower outlet 212 of a subsequent settling compartment 168 in series. Thus, for instance, the backwash fluid 190 for the first settling compartment 168a is preferably provided from the lower outlet 212 of one or more of the subsequent second to ninth settling compartments 168b–i. In order to control the flow of the backwash fluid 190 to the desired settling compartment 168, and to otherwise further enhance the flexibility with respect to the operation and functioning of the settling tank 160, the pipe manifold 226 is preferably provided with a plurality of actuatable manifold valves 232.

Each manifold valve 232 is preferably able to be selectively opened or closed to permit the passage of fluids within the pipe manifold 226 therethrough. Further, each of the manifold valves 232 is also preferably configured such that each valve 232 may be independently opened and closed. Thus, the fluid flow through each of the manifold inlets 228, each of the manifold outlets 230 and through the structure of the pipe manifold 226 itself may be closely controlled.

Each manifold valve 232 may be comprised of any suitable valving structure compatible with its intended function. Further, each manifold valve 232 may be actuated between the opened and closed positions in any suitable manner, such as by a manually actuated handle or lever 234. Preferably, the handle or lever 234 is mounted for ease of access by the operator of the settling tank 160.

As a result, in the preferred embodiment, the lower outlet valves 222, the backwash fluid source valves 208 and the manifold valves 232 are each configured so that they may be actuated in order to supply the backwash fluid 190 to one or more selected backwash fluid sources 189 from one or more selected lower outlets 212. The configuration of each of these valves 222, 208 and 232 also permits close control over the operation and functioning of the settling tank 160 as a unit, and over each individual settling compartment 168 thereof.

In addition, the settling tank 160 may be further comprised of a solids transport pipe assembly 236 connected directly or indirectly with the pipe manifold 226. The solids transport pipe assembly 236 is provided for conducting all or a portion of the lower separated fraction 166 for further processing. In particular, the solids transport pipe assembly 236 is preferably connected directly or indirectly with one or more of the manifold outlets 230, preferably manifold outlets 230b and 230c. Further, the solids transport pipe assembly preferably conducts the lower separated fraction 166 from the pipe manifold 226 to at least one centrifuge 34, preferably centrifuges 34a and 34b.

Finally, the settling tank 160 preferably includes one or more pumps 238 associated with the pipe manifold 226 for conducting the various fluids through, or further facilitating the movement or flow of the fluids through, one or more of the backwash fluid pipe assembly 204, the solids removal pipe assembly 220 and the solids transport pipe assembly 236. Preferably, a plurality of pumps 238 are provided which are each configured to be selectively and independently operated to perform its intended function.

Referring to FIG. 12, in the preferred embodiment, the settling tank 160 includes at least three pumps 238. A first pump 238a is associated with at least one manifold outlet 230, preferably manifold outlet 230a, and the backwash fluid pipe assembly 204 for conducting the backwash fluid 190 from the pipe manifold 226 to the backwash fluid sources 188. A second and third pump 238b, 238c are each associated with at least one manifold outlet 230, preferably manifold outlets 230b and 230c respectively, and the solids transport pipe assembly 236 for conducting the lower separated fractions 166 from the pipe manifold 226 to the centrifuges 34.

The method of the within invention for separating the solids containing fluid 162 is preferably performed using the preferred embodiment of the settling tank 160 described above. Referring to FIG. 9, the solids containing fluid 162 is passed through the inlet 178 of the first settling tank 168a and then through the first settling compartment 168a generally in the first direction 182, while concurrently directing the backwash fluid 190 within the first settling compartment 168a generally in the second direction 192 which is substantially opposite to the first direction 182. More particularly, the backwash fluid 190 is preferably directed by directing the backwash fluid 190 adjacent to the lower end 170 of the first settling compartment 168a.

Due to the direction of the solids containing fluid 162 in the first direction 182 and the direction of the backwash fluid 190 in the second direction 192, a rolling action 194 and enhanced residence time of the solids containing fluid 162 are provided in the settling tank 168a. As a result, the solids containing fluid 162 separates into the upper separated fraction 164 and the lower separated fraction 166. The method therefore further includes withdrawing the lower separated fraction 166 from the lower outlet 212 of the first settling compartment 168a. Further, the method also preferably includes withdrawing the upper separated fraction 164 from the upper outlet 180 of the first settling compartment 168a.

In order to enhance the method, the method may include moving the lower separated fraction 166 toward the lower outlet 212 of the first settling compartment 168a. The moving step preferably includes directing the backwash fluid 190 adjacent to the lower end 170 of the first settling compartment 168a. In other words, the flow of the backwash fluid 190 in the second direction 192 may also act to move the lower separated fraction 166 towards the lower outlet 212 for withdrawal therefrom.

In the preferred embodiment of the method, the method is performed in a plurality of settling compartments 168. Thus, the above noted method steps are preferably repeated as the solids containing fluid 162 passes through each of the first to ninth settling compartments 168a–i in series, as shown in FIGS. 9 and 17.

Thus, for instance, with respect to the first and second settling compartments 168a, 168b, the method further includes withdrawing the upper separated fraction 164 from the upper outlet 180 of the first settling compartment 168a and passing the upper separated fraction 164 through the subsequent settling compartment 168b generally in the first direction 182. As discussed previously, when the upper separated fraction 164 exits or is withdrawn through the upper outlet 180 of the previous settling compartment 168a, the upper separated fraction 164 comprises the solids containing fluid 162 entering or passing through the inlet 178 of the subsequent settling compartment 168b. The backwash fluid 190 is concurrently directed within the subsequent second settling compartment 168b generally in the second direction 192. These steps are repeated for each of the plurality of subsequent third to ninth settling compartments 168c–i.

Further, as described previously, the method preferably further includes withdrawing the lower separated fraction 166 from at least one of the subsequent settling compartments 168b–i and directing the lower separated fraction 166 within the first settling compartment 168a or an earlier one of the subsequent settling compartments as the backwash fluid 190.

Further, as described previously, the backwash fluid directing step in the first settling compartment 168a and each of the subsequent settling compartments 168b–i preferably includes directing the backwash fluid 190 adjacent to the lower end 170 of the settling compartment. As well, in the first settling compartment 168a and each of the subsequent settling compartments 168b–i, the method preferably includes moving the lower separated fraction 166 toward the lower outlet 212 located adjacent to the lower end 170. The moving step may thus be comprised of the step of directing the backwash fluid 190 adjacent to the lower end 170.

Finally, a method of clarifying the solids containing fluid 162 is provided herein. More particularly, the clarifying method is preferably performed to clarify or clean the drilling fluid 14 following the completion of the drilling of the "mud-main hole" as described above. Specifically, the clarifying method is performed to remove the mud or solids from the drilling fluid in order to re-claim the water. Thus, the clarifying method preferably results in the production of relatively clean water from the drilling mud.

In the preferred embodiment, the clarifying method is performed using the previously described settling tank 160. Further, when performing the method, three of the isolatable settling compartments 168 connected in series are used at a time, although the method is preferably repeated for a different combination of three settling compartments 168, as described below, until a clean water product is contained in each of the settling compartments 168.

The three settling compartments 168 need not necessarily be directly connected together in a row, as long as the three compartments 168 are connected in series. In other words, any three of the nine settling compartments 168a–i of the preferred embodiment may be selected. However, the designated second settling compartment must be located between the designated first and third settling compartments. For illustration purposes, the method will be described below in which the designated first settling compartment is the first settling compartment 168a, the designated second settling compartment is the second settling compartment 168b and the designated third settling compartment is the third settling compartment 168c.

In performing the clarifying method, a substantially empty second settling compartment 168b is first provided, wherein the second settling compartment 168b is located between the first settling compartment 168a and the third settling compartment 168c. The second settling compartment 168b may be emptied in any manner, preferably by withdrawing any fluids therein from the lower outlet 212. However, as discussed below, the performance of the clarifying method will ultimately result in the emptying of the third settling compartment 168c. Thus, if the method is repeated, the now empty third settling compartment 168a may be designated as the empty second settling compartment for the next repeated performance of the method.

Next the third settling compartment 168c is substantially emptied of a solids containing fluid 162. In other words, the solids containing fluid 162 desired to be cleaned or clarified is preferably contained in the third settling compartment 168c at the commencement of the method. The solids containing fluid 162 may be emptied from the third settling compartment 168c in any manner, preferably by withdrawing any fluids therein from the lower outlet 212.

A clarifying fluid from the first settling compartment 168a is combined with the solids containing fluid 162 from the third settling compartment 168c in order to provide a combined fluid. Thus, the clarifying fluid is preferably contained in the first settling compartment 168a at the commencement of the method.

The clarifying fluid may be provided from any source. Further, the clarifying fluid may be comprised of any fluid suitable for, and capable of, facilitating or enhancing the clearing, cleaning or purifying of the solids containing fluid 162. In the preferred embodiment, the clarifying fluid is comprised of water and a flocculant. Further, in the preferred embodiment, the clarifying fluid in the first settling compartment 168a is initially comprised of "floc water" from the drilling method. However, as discussed further below, as the method is repeated, the clarifying fluid in the next designated first settling compartment is preferably comprised of a recycled portion of the water reclaimed by the clarifying method.

The clarifying fluid and the solids containing fluid 162 may be combined in any manner and in any suitable structure. However, preferably, the clarifying fluid is emptied from the first settling compartment 168a, such as by withdrawing the clarifying fluid therein from the lower outlet 212. The clarifying fluid withdrawn from the lower outlet 212 of the first settling compartment 168a is combined with the solids containing fluid 162 withdrawn from the lower outlet 212 of the third settling compartment 168c. The combining of the fluids to provide the combined fluid preferably occurs in the solids removal pipe assembly 220 and the pipe manifold 226.

Next, the combined fluid is introduced into a centrifuge, such as one or both of centrifuges 34a and 34b. The combined fluid may introduced into or conducted or transported to the centrifuge 34 in any manner and by any suitable structure or mechanism for conveying the combined fluid. In the preferred embodiment, the combined fluid is conducted from the pipe manifold 226 to the centrifuge 34 by the solids transport pipe assembly 236. Thus, more particularly, the combined fluid is pumped from the manifold outlets 230*b* and 230*c* by pumps 238*b* and 238*c* into the solids transport pipe assembly 236, which conducts the combined fluid therethrough to the centrifuges 34*a* and 34*b*.

The combined fluid is allowed to separate in the centrifuge 34 into a centrifuge fluid fraction and a centrifuge solids fraction. The centrifuge is operated in a conventional manner to separate the combined fluid therein. The resulting centrifuge solids fraction is removed for disposal or storage. For instance, the centrifuge solids fraction may be conveyed by conduit 112 to the solids bin 32.

As discussed above, the centrifuge fluid fraction is returned to the first settling compartment 168*a* as the clarifying fluid. Thus, the centrifuge fluid fraction provides the clarifying fluid for the next repeated performance of the method. The centrifuge fluid fraction may be returned to the first settling compartment 168*a* in any manner and by any suitable structure or mechanism for conveying the centrifuge fluid fraction. For instance, the centrifuge fluid fraction may be conveyed by a conduit from the centrifuge 34 to the inlet 168 of the first settling compartment 168*a*.

Finally, a portion of the centrifuge fluid fraction is allowed to pass from the first settling compartment 168*a* to the second settling compartment 168*b* so that the first settling compartment 168*a* and the second settling compartment 168*b* both contain the clarifying fluid and so that the third settling compartment 168*c* is substantially empty. As the first and second settling compartments 168*a*, 168*b* are connected in series, the clarifying fluid is simply permitted to flow from the upper outlet 180 of the first settling compartment 168*a* into the inlet 178 of the second settling compartment 168*b*.

At the completion of the method, the first and second settling compartments 168*a*, 168*b* contain the clarifying fluid and the third settling compartment 168*b* is substantially empty. If desired, the method may now be repeated for the next settling compartment in series containing the solids containing fluid 162. Thus, in the next repeated performance of the method, for illustration purposes, either the first or second settling compartments 168*a*, 168*b*, and preferably the first settling compartment 168*a*, is designated as the "first settling compartment" for the method. The now empty third settling compartment 168*c* is designated as the "second settling compartment" for the method. Finally, any of the subsequent settling compartments 168*d*–*i* may be designated as the "third settling compartment" for the method, but preferably the fourth settling compartment 168*d* is designated as the "third settling compartment."

Accordingly, for illustration purposes, in the next repeated performance of the method, a substantially empty third settling compartment 168*c* is provided by the previous performance of the clarifying method. Next the fourth settling compartment 168*d* is substantially emptied of a solids containing fluid 162 contained therein. The clarifying fluid from the first settling compartment 168*a* is combined with the solids containing fluid 162 from the fourth settling compartment 168*d* in order to provide the combined fluid.

The combined fluid is then introduced into the centrifuge 34 and allowed to separate in the centrifuge 34 into a centrifuge fluid fraction and a centrifuge solids fraction. The resulting centrifuge solids fraction is again removed for disposal or storage to the solids bin 32. The centrifuge fluid fraction is returned to the first settling compartment 168*a* as the clarifying fluid.

Finally, a portion of the centrifuge fluid fraction is allowed to pass from the first settling compartment 168*a* to the third settling compartment 168*c* so that the first settling compartment 168*a* and the third settling compartment 168*c* both contain the clarifying fluid and so that the fourth settling compartment 168*d* is substantially empty. As each of the first, second and third settling compartments 168*a*, 168*b* and 168*c* are connected in series, when the centrifuge fluid fraction is returned to the first settling compartment 168*a* as the clarifying fluid, the overflow of the clarifying fluid will pass from the upper outlet 180 of the first settling compartment 168*a* into the inlet 178 of the second settling compartment 168*b*, and subsequently from the upper outlet 180 of the second settling compartment 168*b* into the inlet 178 of the third settling compartment 168*c*.

Thus, at the completion of the next repeated method, the first and third settling compartments 168*a*, 168*c*, and more particularly, the first, second and third settling compartments 168*a*, 168*b*, 168*c* contain the clarifying fluid and the fourth settling compartment 168*d* is substantially empty. If desired, the method may now be repeated again for the next settling compartment in series containing the solids containing fluid 162.

Although the present invention has been described in some detail by way of example for purposes of clarity and understanding, it will be apparent that certain changes and modifications may be practised within the scope of the appended claims.

Finally, in this document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The embodiments of the invention in which an exclusive property or privilege is claimed are defined as follows:

1. A settling tank for use in separating a solids containing fluid, the settling tank comprising a settling compartment, the settling compartment comprising:

(a) an inlet and an upper outlet so that the fluid passes through the settling compartment generally in a first direction from the inlet toward the upper outlet; and (b) a backwash fluid source for directing a backwash fluid within the settling compartment generally in a second direction which is substantially opposite to the first direction.

2. The settling tank as claimed in claim 1 wherein the settling compartment is comprised of a lower end and wherein the backwash fluid source is positioned adjacent to the lower end of the settling compartment.

3. The settling tank as claimed in claim 2 wherein the backwash fluid source is configured so that the backwash fluid is directed substantially horizontally from the backwash fluid source.

4. The settling tank as claimed in claim 3 wherein the settling compartment is further comprised of a lower outlet located adjacent to the lower end of the settling compartment.

5. The settling tank as claimed in claim 4 wherein the lower outlet is located between the inlet and the backwash fluid source so that the backwash fluid source directs the backwash fluid generally toward the lower outlet.

6. The settling tank as claimed in claim 5 wherein the backwash fluid source is comprised of a nozzle.

7. The settling tank as claimed in claim 5 wherein the backwash fluid source is positioned less than about three inches from the lower end of the settling compartment.

8. The settling tank as claimed in claim 5, further comprising a solids removal pipe in communication with the lower outlet, for withdrawing a lower separated fraction from the settling compartment.

9. The settling tank as claimed in claim 8, further comprising a backwash fluid pipe in communication with the backwash fluid source, for supplying the backwash fluid to the backwash fluid source.

10. The settling tank as claimed in claim 5 wherein the settling compartment is comprised of a sidewall and wherein the sidewall is sloped so that the settling compartment narrows toward the lower end of the settling compartment.

11. The settling tank as claimed in claim 5 wherein the settling tank is comprised of a plurality of the settling compartments connected in series.

12. The settling tank as claimed in claim 11 wherein each of the settling compartments is comprised of two ends and wherein the settling compartments are configured to provide a plurality of the settling compartments arranged end to end in a column.

13. The settling tank as claimed in claim 12 wherein the settling compartments are configured to provide a plurality of adjacent columns of the settling compartments.

14. The settling tank as claimed in claim 13 wherein the settling tank is comprised of nine settling compartments and wherein the settling compartments are configured to provide three columns of the settling compartments and three of the settling compartments in each of the columns.

15. The settling tank as claimed in claim 11 wherein each of the settling compartments is comprised of two sides and wherein the settling compartments are configured to provide a plurality of the settling compartments arranged side by side in a row.

16. The settling tank as claimed in claim 11, further comprising a solids removal pipe assembly in communication with each of the lower outlets, for withdrawing a lower separated fraction from each of the settling compartments.

17. The settling tank as claimed in claim 16, further comprising a backwash fluid pipe assembly in communication with each of the backwash fluid sources, for supplying the backwash fluid to the backwash fluid sources.

18. The settling tank as claimed in claim 17, further comprising a pipe manifold, wherein both the solids removal pipe assembly and the backwash fluid pipe assembly are connected with the pipe manifold.

19. The settling tank as claimed in claim 18 wherein each of the lower outlets is provided with an actuatable lower outlet valve so that each of the lower outlets may be selectively opened and closed and wherein each of the backwash fluid sources is provided with an actuatable backwash fluid source valve so that each of the backwash fluid sources may be selectively opened and closed.

20. The settling tank as claimed in claim 19 wherein the lower outlet valves and the backwash fluid source valves are configured so that each of the lower outlets and each of the backwash fluid sources may be independently opened and closed.

21. The settling tank as claimed in claim 20 wherein the pipe manifold is provided with a plurality of actuatable manifold valves which may be actuated in order to supply the backwash fluid to the backwash fluid sources from the lower outlets.

22. The settling tank as claimed in claim 21 wherein the lower outlet valves, the backwash fluid source valves and the manifold valves are configured so that they may be actuated in order to supply the backwash fluid to one or more selected backwash fluid sources from one or more selected lower outlets.

23. The settling tank as claimed in claim 22, further comprising a solids transport pipe assembly, wherein the solids transport pipe assembly is connected with the pipe manifold.

24. The settling tank as claimed in claim 23 wherein the solids transport pipe assembly is adapted to connect the pipe manifold with at least one centrifuge.

25. The settling tank as claimed in claim 24, further comprising a plurality of pumps associated with the pipe manifold, for supplying the backwash fluid to the backwash fluid sources and for supplying the lower separated fractions to the solids transport pipe assembly.

26. The settling tank as claimed in claim 25 wherein the pipe manifold and the pumps are configured so that each of the pumps may be selectively and independently operated to supply the backwash fluid only to the backwash fluid sources, to supply the lower separated fractions only to the solids transport pipe assembly, or both to supply the backwash fluid to the backwash fluid sources and supply the lower separated fractions to the solids transport pipe assembly.

27. A method of separating a solids containing fluid, comprising the following steps:
  (a) passing the fluid through a first settling compartment generally in a first direction; and
  (b) directing a backwash fluid within the first settling compartment generally in a second direction which is substantially opposite to the first direction.

28. The method as claimed in claim 27, further comprising the step of withdrawing an upper separated fraction from an upper outlet associated with the first settling compartment.

29. The method as claimed in claim 28, further comprising the step of withdrawing a lower separated fraction from a lower outlet located adjacent to a lower end of the first settling compartment.

30. The method as claimed in claim 27 wherein the backwash fluid is directed within the settling compartment under substantially laminar flow conditions.

31. The method as claimed in claim 30 wherein the first direction is a substantially horizontal direction and wherein the second direction is a substantially horizontal direction.

32. The method as claimed in claim 31 wherein the backwash fluid directing step is comprised of directing the backwash fluid adjacent to a lower end of the first settling compartment.

33. The method as claimed in claim 32, further comprising the step of moving a lower separated fraction of the fluid toward a lower outlet located adjacent to the lower end of the first settling compartment.

34. The method as claimed in claim 33 wherein the step of moving the lower separated fraction toward the lower outlet is comprised of the step of directing the backwash fluid adjacent to the lower end of the first settling compartment.

35. The method as claimed in claim 27 wherein the fluid is passed at a fluid flowrate, wherein the backwash fluid is directed at a backwash fluid flowrate, and wherein the backwash fluid flowrate is substantially less than the fluid flowrate.

36. The method as claimed in claim 35 wherein the backwash fluid flowrate is less than about fifty percent of the fluid flowrate.

37. The method as claimed in claim 35 wherein the backwash fluid flowrate is less than about twenty percent of the fluid flowrate.

38. The method as claimed in claim 27, further comprising the following steps:
(c) withdrawing an upper separated fraction from an upper outlet associated with the first settling compartment;
(d) passing the upper separated fraction through a subsequent settling compartment generally in a first direction; and
(e) directing the backwash fluid within the subsequent settling compartment generally in a second direction which is opposite to the first direction.

39. The method as claimed in claim 38, further comprising repeating steps (c), (d) and (e) in a plurality of subsequent settling compartments.

40. The method as claimed in claim 39, further comprising the step of withdrawing a lower separated fraction from at least one of the subsequent settling compartments and directing the lower separated fraction within the first settling compartment or an earlier one of the subsequent settling compartments as the backwash fluid.

41. The method as claimed in claim 39 wherein the backwash fluid is directed within the first settling compartment and each of the subsequent settling compartments under substantially laminar flow conditions.

42. The method as claimed in claim 41 wherein the first direction in the first settling compartment and each of the subsequent settling compartments is a substantially horizontal direction and wherein the second direction in the first settling compartment and each of the subsequent settling compartments is a substantially horizontal direction.

43. The method as claimed in claim 42 wherein the backwash fluid directing step in the first settling compartment and each of the subsequent settling compartments is comprised of directing the backwash fluid adjacent to a lower end of the settling compartment.

44. The method as claimed in claim 43, further comprising the step in the first settling compartment and each of the subsequent settling compartments of moving a lower separated fraction toward a lower outlet located adjacent to the lower end of the settling compartment.

45. The method as claimed in claim 44 wherein the step of moving the lower separated fraction toward the lower outlet in the first settling compartment and each of the subsequent settling compartments is comprised of the step of directing the backwash fluid adjacent to the lower end of the settling compartment.

46. The method as claimed in claim 38, further comprising repeating steps (c), (d) and (e) in eight subsequent settling compartments.

* * * * *